US010089953B2

(12) United States Patent
Furihata et al.

(10) Patent No.: US 10,089,953 B2
(45) Date of Patent: Oct. 2, 2018

(54) IMAGE PROCESSING CIRCUIT FOR IMAGE COMPRESSION AND DECOMPRESSION AND DISPLAY PANEL DRIVER INCORPORATING THE SAME

(71) Applicant: Synaptics Japan GK, Tokyo (JP)

(72) Inventors: Hirobumi Furihata, Tokyo (JP); Takashi Nose, Tokyo (JP); Akio Sugiyama, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 169 days.

(21) Appl. No.: 14/063,968

(22) Filed: Oct. 25, 2013

(65) Prior Publication Data

US 2014/0146098 A1    May 29, 2014

(30) Foreign Application Priority Data

Nov. 28, 2012    (JP) .................... 2012-260176

(51) Int. Cl.
*G06T 13/00*    (2011.01)
*G09G 5/00*    (2006.01)
(Continued)

(52) U.S. Cl.
CPC ............. *G09G 5/00* (2013.01); *G09G 3/2092* (2013.01); *H04N 19/12* (2014.11); *H04N 19/14* (2014.11);
(Continued)

(58) Field of Classification Search
CPC ........... G06T 1/20; G06T 15/005; G06T 1/60; G09G 5/363; G06F 3/14
(Continued)

(56) References Cited

U.S. PATENT DOCUMENTS 5,067,162 A * 11/1991 Driscoll, Jr. ....... G06K 9/00067
382/126
7,289,154 B2 * 10/2007 Gindele ................. G06T 5/008
348/222.1
(Continued)

FOREIGN PATENT DOCUMENTS

CN    101197118 A    6/2008
CN    101620842 A    1/2010
(Continued)

OTHER PUBLICATIONS

"Cost Effective Block Truncation Coding for Color Image Compression" (by J. Wang, K.Y. Min, J.W. Chong, in Advanced in Information Sciences and Service Sciences, vol. 2, No. 3, Sep. 2010).*
(Continued)

*Primary Examiner* — Ke Xiao
*Assistant Examiner* — Gordon Liu
(74) *Attorney, Agent, or Firm* — Patterson + Sheridan, LLP

(57) ABSTRACT

An image processing circuit includes: a representative-values calculation circuit and an all-combinations comparing compression circuit. The representative-values calculation circuit is configured to generate M datasets each including a plurality of representative values by performing a pre-process on image data associated with said N pixels, M being a natural number more than one and less than N. The all-combinations comparing compression circuit is configured to calculate correlations between two datasets selected from said M datasets for all possible combinations of the two datasets, to select a compression process from a plurality of compression processes in response to the calculated correlations, and to generate said compressed imaged data by compressing said M datasets by using said
(Continued)

selected compression process. The image processing circuit may be incorporated in a display panel driver.

20 Claims, 26 Drawing Sheets

(51) Int. Cl.
  *H04N 19/12* (2014.01)
  *H04N 19/14* (2014.01)
  *H04N 19/186* (2014.01)
  *H04N 19/17* (2014.01)
  *G09G 3/20* (2006.01)
  *G09G 3/36* (2006.01)

(52) U.S. Cl.
  CPC .......... *H04N 19/17* (2014.11); *H04N 19/186* (2014.11); *G09G 3/3648* (2013.01); *G09G 2310/027* (2013.01); *G09G 2340/02* (2013.01); *G09G 2360/16* (2013.01); *G09G 2360/18* (2013.01)

(58) Field of Classification Search
  USPC ....................................................... 345/501
  See application file for complete search history.

(56) References Cited

U.S. PATENT DOCUMENTS

| | | | |
|---|---|---|---|
| 7,734,103 B2 | 6/2010 | Sato et al. | |
| 7,912,304 B2 | 3/2011 | Furihata et al. | |
| 8,111,933 B2 | 2/2012 | Furihata et al. | |
| 8,228,319 B2 | 7/2012 | Furihata et al. | |
| 8,385,668 B2 | 2/2013 | Furihata et al. | |
| 8,923,636 B2 | 12/2014 | Furihata et al. | |
| 2007/0031047 A1 | 2/2007 | Sato et al. | |
| 2008/0117198 A1 | 5/2008 | Furihata et al. | |
| 2009/0003693 A1 | 1/2009 | Yamamoto | |
| 2009/0080531 A1 | 3/2009 | Hashiguchi et al. | |
| 2009/0322713 A1* | 12/2009 | Furihata et al. | 345/204 |
| 2011/0148844 A1 | 6/2011 | Furihata et al. | |
| 2012/0127188 A1 | 5/2012 | Furihata et al. | |
| 2012/0239627 A1 | 9/2012 | Nyuunoya | |
| 2013/0141449 A1 | 6/2013 | Furihata et al. | |

FOREIGN PATENT DOCUMENTS

| | | |
|---|---|---|
| CN | 101765009 A | 6/2010 |
| CN | 102737093 A | 10/2012 |
| JP | 3036058 B | 4/2000 |
| JP | 2006-042194 A | 2/2006 |
| JP | 3790728 B | 6/2006 |
| JP | 2007-43577 A | 2/2007 |
| JP | 2009-212789 A | 9/2009 |
| JP | 4507265 B | 7/2010 |
| JP | 2011-019204 A | 1/2011 |

OTHER PUBLICATIONS

Chinese Office Action dated Mar. 28, 2017 in Chinese Application No. 201310525246.6 with an English translation thereof.

* cited by examiner

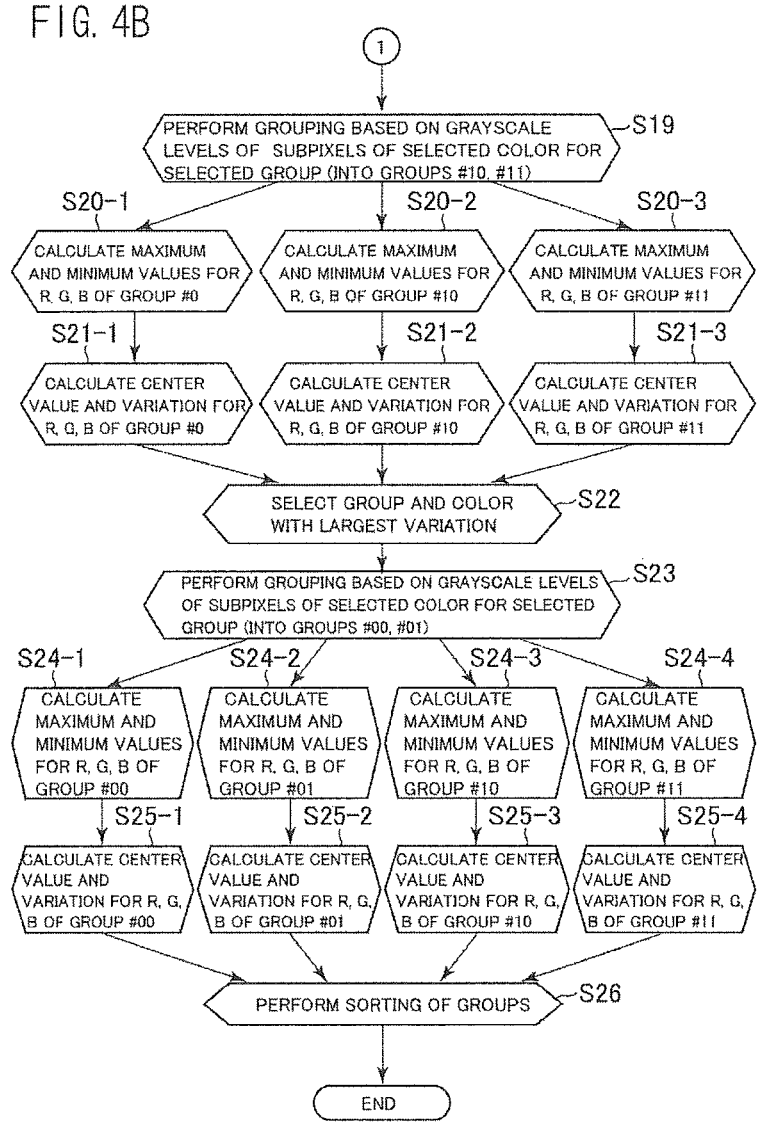

FIG. 5

INPUT IMAGE DATA

|  | R | G | B |
|---|---|---|---|
| PIXEL#0 | 100 | 200 | 97 |
| PIXEL#1 | 101 | 205 | 132 |
| PIXEL#2 | 102 | 210 | 164 |
| PIXEL#3 | 103 | 215 | 187 |
| PIXEL#4 | 104 | 220 | 97 |
| PIXEL#5 | 105 | 225 | 132 |
| PIXEL#6 | 106 | 230 | 164 |
| PIXEL#7 | 107 | 235 | 187 |

FIG. 6

MAXIMUM VALUE, MINIMUM VALUE AND DIFFERENCE

| Rmax | Gmax | Bmax |
|---|---|---|
| 107 | 235 | 187 |
| Rmin | Gmin | Bmin |
| 100 | 200 | 97 |
| Rdiff | Gdiff | Bdiff |
| 7 | 35 | 90 |

VARIATION OF B SUBPIXELS IS LARGEST

FIG. 7

COMPARE GRAYSCALE LEVELS OF
B SUBPIXELS WITH B_center

|  | R | G | B | vs B_center | GROUP |
|---|---|---|---|---|---|
| PIXEL#0 | 100 | 200 | 97 | < | 1 |
| PIXEL#1 | 101 | 205 | 132 | < | 1 |
| PIXEL#2 | 102 | 210 | 164 | > | 0 |
| PIXEL#3 | 103 | 215 | 187 | > | 0 |
| PIXEL#4 | 104 | 220 | 97 | < | 1 |
| PIXEL#5 | 105 | 225 | 132 | < | 1 |
| PIXEL#6 | 106 | 230 | 164 | > | 0 |
| PIXEL#7 | 107 | 235 | 187 | > | 0 |

B_center
=142

FIG. 8

| GROUP#0 | | | GROUP#1 | | |
|---|---|---|---|---|---|
| Rmax | Gmax | Bmax | Rmax | Gmax | Bmax |
| 107 | 235 | 187 | 105 | 225 | 132 |
| Rmin | Gmin | Bmin | Rmin | Gmin | Bmin |
| 102 | 210 | 164 | 100 | 200 | 97 |
| Rdiff | Gdiff | Bdiff | Rdiff | Gdiff | Bdiff |
| 5 | 25 | 23 | 5 | 25 | 35 |

Bdiff OF GROUP #1 IS LARGEST

FIG. 9

GROUP#1

| | R | G | B | vs B_center | GROUP |
|---|---|---|---|---|---|
| PIXEL#0 | 100 | 200 | 97 | < | 11 |
| PIXEL#1 | 101 | 205 | 132 | > | 10 |
| PIXEL#4 | 104 | 220 | 97 | < | 11 |
| PIXEL#5 | 105 | 225 | 132 | > | 10 |

B_center =114

FIG. 10

| GROUP#0 | | | | | | GROUP#10 | | | | | | GROUP#11 | | | | | |
|---|---|---|---|---|---|---|---|---|---|---|---|---|---|---|---|---|---|
| Rmax | Gmax | | Bmax | | | Rmax | Gmax | | Bmax | | | Rmax | Gmax | | Bmax | | |
| 107 | 235 | | 187 | | | 105 | 225 | | 132 | | | 104 | 220 | | 97 | | |
| Rmin | Gmin | | Bmin | | | Rmin | Gmin | | Bmin | | | Rmin | Gmin | | Bmin | | |
| 102 | 210 | | 164 | | | 101 | 205 | | 132 | | | 100 | 200 | | 97 | | |
| Rdiff | Gdiff | | Bdiff | | | Rdiff | Gdiff | | Bdiff | | | Rdiff | Gdiff | | Bdiff | | |
| 5 | 25 | | 23 | | | 4 | 20 | | 0 | | | 4 | 20 | | 0 | | |

Gdiff OF GROUP #0 IS LARGEST

GROUP#0

| | R | G | B | vs G_center | GROUP |
|---|---|---|---|---|---|
| PIXEL#2 | 102 | 210 | 164 | < | 01 |
| PIXEL#3 | 103 | 215 | 187 | < | 01 |
| PIXEL#6 | 106 | 230 | 164 | > | 00 |
| PIXEL#7 | 107 | 235 | 187 | > | 00 |

G_center =222

FIG. 13

DATASET A : R_center, G_center AND B_center OF GROUP #00
DATASET B : R_center, G_center AND B_center OF GROUP #01
DATASET C : R_center, G_center AND B_center OF GROUP #10
DATASET D : R_center, G_center AND B_center OF GROUP #11

FIG. 15

|  | GROUP | R | G | B |
|---|---|---|---|---|
| PIXEL#0 | 00 | 102 | 210 | 97 |
| PIXEL#1 | 01 | 103 | 215 | 132 |
| PIXEL#2 | 10 | 102 | 212 | 175 |
| PIXEL#3 | 10 | 102 | 212 | 175 |
| PIXEL#4 | 00 | 102 | 210 | 97 |
| PIXEL#5 | 01 | 103 | 215 | 132 |
| PIXEL#6 | 11 | 106 | 232 | 175 |
| PIXEL#7 | 11 | 106 | 232 | 175 |

FIG. 17

|  | R | G | B |
|---|---|---|---|
| PIXEL#0 | 100 | 200 | 97 |
| PIXEL#1 | 101 | 205 | 132 |
| PIXEL#2 | 102 | 210 | 164 |
| PIXEL#3 | 103 | 215 | 187 |
| PIXEL#4 | 104 | 220 | 97 |
| PIXEL#5 | 105 | 225 | 132 |
| PIXEL#6 | 106 | 230 | 164 |
| PIXEL#7 | 107 | 235 | 187 |

FIG. 18

|  | Y | Cr | Cb |
|---|---|---|---|
| PIXEL#0 | 597 | 100 | 103 |
| PIXEL#1 | 643 | 104 | 73 |
| PIXEL#2 | 686 | 108 | 46 |
| PIXEL#3 | 720 | 112 | 28 |
| PIXEL#4 | 641 | 116 | 123 |
| PIXEL#5 | 687 | 120 | 93 |
| PIXEL#6 | 730 | 124 | 66 |
| PIXEL#7 | 764 | 128 | 48 |

FIG. 19

| Cr_Max | Cb_Max |
|---|---|
| 128 | 123 |
| Cr_Min | Cb_Min |
| 100 | 28 |
| Cr_Diff | Cb_Diff |
| 28 | 95 |

↑
SELECT Cb FOR STANDARD, SINCE Cb_Diff > Cr_Diff

FIG. 20

| Y | Cr | Cb | vs Cb_Center | GROUP |
|---|---|---|---|---|
| 597 | 100 | 103 | > | 0 |
| 643 | 104 | 73 | < | 1 |
| 686 | 108 | 46 | < | 1 |
| 720 | 112 | 28 | < | 1 |
| 641 | 116 | 123 | > | 0 |
| 687 | 120 | 93 | > | 0 |
| 730 | 124 | 66 | < | 1 |
| 764 | 128 | 48 | < | 1 |

ALWAYS ASSIGN PIXEL #0 TO GROUP #0   Cb_Center=75

FIG. 21

| GROUP 0 | | GROUP 1 | |
|---|---|---|---|
| Cr_Max0 | Cb_Max0 | Cr_Max1 | Cb_Max1 |
| 120 | 123 | 128 | 73 |
| Cr_Min0 | Cb_Min0 | Cr_Min1 | Cb_Min1 |
| 100 | 93 | 104 | 28 |
| Cr_Center0 | Cb_Center0 | Cr_Center1 | Cb_Center1 |
| 110 | 108 | 116 | 50 |

FIG. 22

| | R DATA | G DATA | B DATA |
|---|---|---|---|
| DATASET A | Y0 | Cr0 | Y4 |
| DATASET B | Y1 | Cb0 | Y5 |
| DATASET C | Y2 | Cr1 | Y6 |
| DATASET D | Y3 | Cb1 | Y7 |

FIG. 24

|  | Y*4 | Cr | Cb |
|---|---|---|---|
| PIXEL#0 | 596 | 110 | 108 |
| PIXEL#1 | 644 | 116 | 50 |
| PIXEL#2 | 688 | 116 | 50 |
| PIXEL#3 | 720 | 116 | 50 |
| PIXEL#4 | 640 | 110 | 108 |
| PIXEL#5 | 688 | 110 | 108 |
| PIXEL#6 | 732 | 116 | 50 |
| PIXEL#7 | 764 | 116 | 50 |

FIG. 25

|  | R | G | B |
|---|---|---|---|
| PIXEL#0 | 94 | 204 | 96 |
| PIXEL#1 | 87 | 203 | 153 |
| PIXEL#2 | 98 | 214 | 164 |
| PIXEL#3 | 106 | 222 | 172 |
| PIXEL#4 | 105 | 215 | 107 |
| PIXEL#5 | 117 | 227 | 119 |
| PIXEL#6 | 109 | 225 | 175 |
| PIXEL#7 | 117 | 233 | 183 |

FIG. 26

| COMPRESSION TYPE RECOGNITION BITS (4 bits) | PATTERN TYPE DATA (3 bits) | DATA#1 (8 bits) | DATA#2 (8 bits) | DATA#3 (8 bits) | DATA#4 (8 bits) | DATA#5 (8 bits) | PADDING (1 bit) |

FIG. 27

| COMPRESSION TYPE RECOGNITION BIT (1 bit) | R$_A$*DATA (4 bits) | G$_A$*DATA (4 bits) | B$_A$*DATA (4 bits) | R$_B$*DATA (4 bits) | G$_B$*DATA (4 bits) | B$_B$*DATA (4 bits) |

| R$_C$*DATA (4 bits) | G$_C$*DATA (4 bits) | B$_C$*DATA (4 bits) | R$_D$*DATA (4 bits) | G$_D$*DATA (4 bits) | B$_D$*DATA (3 bits) |

FIG. 28

| COMPRESSION TYPE RECOGNITION BITS (2 bits) | SELECTION DATA (3 bits) | R REPRESENTATIVE VALUE (5 or 6 bits) | G REPRESENTATIVE VALUE (5 or 6 bits) | B REPRESENTATIVE VALUE (5 bits) | ADDITIONAL INFORMATION DATA (2-4 bits) |

DATA FOR TWO DATASETS WITH HIGH CORRELATION

| Ri*DATA (4 bits) | Gi*DATA (4 bits) | Bi*DATA (4 bits) | Rj*DATA (4 bits) | Gj*DATA (4 bits) | Bj*DATA (4 bits) |

DATA FOR TWO DATASETS WITH LOW CORRELATION

FIG. 29

| COMPRESSION TYPE RECOGNITION BITS (3 bits) | SELECTION DATA (2 bits) | DATA FOR TWO DATASETS ||| DATA FOR TWO DATASETS ||| ADDITIONAL INFORMATION DATA (6-12 bits) |
|---|---|---|---|---|---|---|---|---|
| | | R REPRESENTATIVE VALUE#1 (5 or 6 bits) | G REPRESENTATIVE VALUE#1 (5 or 6 bits) | B REPRESENTATIVE VALUE#1 (5 or 6 bits) | R REPRESENTATIVE VALUE#2 (5 or 6 bits) | G REPRESENTATIVE VALUE#2 (6 or 7 bits) | B REPRESENTATIVE VALUE#2 (5 or 6 bits) | |

FIG. 30

| COMPRESSION TYPE RECOGNITION BITS (4 bits) | Ymin (10 bits) | Ydist0 (4 bits) | Ydist1 (4 bits) | Ydist2 (4 bits) | ADDRESS (2 bits) | Cb' (10 bits) | Cr' (10 bits) |

IMAGE PROCESSING CIRCUIT FOR IMAGE COMPRESSION AND DECOMPRESSION AND DISPLAY PANEL DRIVER INCORPORATING THE SAME

CROSS REFERENCE

This application claims a priority on convention based on Japanese Patent Application NO. 2012-260176. The disclosure thereof is incorporated herein by reference.

TECHNICAL FIELD

The present invention relates to an image processing circuit and method, display panel driver and display device, more particularly, to an image processing circuit and method for performing image compression and decompression and a display panel driver and display device incorporating the same.

BACKGROUND ART

Display devices, such as liquid crystal display devices, organic electroluminescence display devices and plasma display devices, are often designed to use an image compression technique. When a display panel driver driving a display panel (such as a liquid crystal display panel, an organic electroluminescence display device, and a plasma display panel) incorporates an image memory, for example, use of image compression allows reducing the capacity of the image memory. When image data are compressed before being transmitted to a display panel driver, on the other hand, this effectively reduces the data transmission amount. The reduction of the data transmission amount contributes the reduction of the data transmission rate and power consumption necessary for transmitting the image data.

One of the generally-used image compression methods is the block coding, in which image data are compressed in units of blocks, each including a plurality of pixels. In block coding, image data associated with a plurality of pixels constituting a block are represented by at least one representative value. One major example of block coding is BTC (block truncation coding). BTC is disclosed in, for example, Japanese Patent Application Publication Nos. 2006-42194 A, 2009-212789 A, 2011-19204 A and Japanese Patent Gazette No. 3,790,728 B. The BTC does not provide high data compression ratio and therefore a technique which repeatedly performs the same BCT-based compression procedure a plurality of times has been proposed (see Japanese Patent Application Publication No. 2007-43577 A and Japanese Patent Gazette No. 3,036,058 B.

Another known compression method is a method in which image data of respective pixels are transformed into data of the frequency domain. One major example of such compression method is DCT (Discrete Cosine Transform). The DCT is a basic technique of image compression such as JPEG (Joint Photographic Experts Group) and widely used in image processing.

When the compression processing is performed with a fixed data length (that is, when the compression ratio is fixed), however, both of the BTC and DCT cause a large compression error for specific types of images, and this results in image deterioration. More specifically, the BTC causes severe image deterioration for images including a large amount of low frequency components (for example, images of photographs and the like), while the DCT causes severe image deterioration for images including a large amount of high frequency components (for example, images including characters and the like). A display device of a portable terminal (for example, smart phones and the like) is often required to display mixture images of characters, still pictures and graphic pictures (for example, when displaying a web site), and under such situations, it is not preferable to use image processing which suffers from a severe image deterioration for a specific type of image.

In order to address such problem, the inventors have proposed a technique in which a compression method is selected in response to the correlation among pixels within the block (see, Japanese Patent Gazette No. 4,507,265 B, for example). One feature of this technique is that a correlation is calculated for every possible combination of two pixels selected from the pixels included in the block. The selection of the compression method in response to the correlations calculated for all the possible combinations effectively reduces the compression error and suppresses the image deterioration.

Although being effective for reducing the compression error, the technique of selecting the compression method in response to the correlations among the pixels in the block undesirably increases the circuit size when pixels to be processed at the same time (that is, the number of pixels included in each block) is increased, due to the increase in the number of combinations of the pixels. In the case that the number of pixels included in a block is four, for example, the number of possible combinations of two pixels from the block is six ($=_4C_2$). In the case that the number of pixels included in a block is eight, on the other hand, the number of possible combinations of two pixels from the block is 28 ($=_8C_2$).

Therefore, a technical need exists for providing a technique for reducing the compression error with a reduced circuit size.

SUMMARY OF INVENTION

Therefore, an objective of the present invention is to provide an image processing circuit and method which effectively reduce the compression error while suppressing the increase in the circuit size, and a display panel driver and display device incorporating the same.

Other objectives of the present invention would be understood from the entire disclosure of the present application.

In an aspect of the present invention, a display panel driver includes: a compression circuit generating compressed image data by compressing image data associated with N pixels, N being an natural number equal to or more than three; an image memory storing the compressed image data; a decompression circuit generating decompressed image data by decompressing the compressed image data read from the image memory; and a drive circuit driving a display panel in response to the decompressed image data. The compression circuit includes: a representative-values calculation circuit configured to generate M datasets each including a plurality of representative values by performing a pre-process on the image data associated with the N pixels, M being a natural number more than one and less than N; and an all-combinations comparing compression circuit configured to calculate correlations between two datasets selected from the M datasets for all possible combinations of the two datasets, to select a compression process from a plurality of compression processes in response to the calculated correlations, and to generate the compressed imaged data by compressing the M datasets by using the selected compression process.

In one embodiment, in the pre-process, the representative-values calculation circuit performs grouping of the N pixels into M groups which are associated with the M datasets, respectively, and calculates the representative values included in each of the M datasets, based on image data of pixels belonging to associated one of the M groups.

When each of the N pixels includes a subpixel associated with a first color, a subpixel associated with a second color and a subpixel associated with a third color, the grouping of the N pixels into the M groups is achieved by initially grouping the N pixels into a single group and repeatedly performing a procedure which involves: selecting a group and color for which a difference between maximum and minimum values of grayscale levels of subpixels is largest from one or more groups of current interest, and grouping pixels belonging to the selected group into two groups depending on grayscale levels of subpixels associated with the selected color.

In one example, the M datasets includes four datasets. In this case, the plurality of compression processes preferably include: a first compression process which involves calculating a first representative value associated with the four datasets and incorporating the first representative value into the compressed image data; a second compression process which involves calculating a second representative value associated with two of the four datasets, calculating a third representative value associated with the other two of the four datasets and incorporating the second and third representative values into the compressed image data; a third compression process which involves calculating a fourth representative value associated with two datasets of the four datasets, generating first bit-reduced data by performing a bit-reducing process on each of the other two datasets independently, and incorporating the fourth representative value and the first bit-reduced data into the compressed image data; and a fourth compression process which involves generating second bit-reduced data by performing a bit-reducing process on each of the four datasets, independently, and incorporating the second bit-reduced data into the compressed image data.

In another embodiment, the N pixels include eight pixels and the M datasets include four datasets each including three representative values. In this case, it is preferable that, in the pre-process, the representative-values calculation circuit generates Y data, Cr data and Cb data for each of the eight pixels by performing a YCrCb transform on image data of the eight pixels, calculates eight first representative values from data selected from the Y data, Cr data and Cb data of the eight pixels, the selected data having a largest difference between maximum and minimum values, and calculates four second representative values from the remaining two of the Y data, Cr data and Cb data of the eight pixels, each of the four datasets including two of the eight first representative values and one of the four second representative values.

In another aspect of the present invention, a display device includes: a display panel; and a display panel driver driving the display panel. The display panel driver includes: a compression circuit generating compressed image data by compressing image data associated with N pixels, N being an natural number equal to or more than three; an image memory storing the compressed image data; a decompression circuit generating decompressed image data by decompressing the compressed image data read from the image memory; and a drive circuit driving a display panel in response to the decompressed image data. The compression circuit includes: a representative-values calculation circuit configured to generate M datasets each including a plurality of representative values by performing a pre-process on the image data associated with the N pixels, M being a natural number more than one and less than N; and an all-combinations comparing compression circuit configured to calculate correlations between two datasets selected from the M datasets for all possible combinations of the two datasets, to select a compression process from a plurality of compression processes in response to the calculated correlations, and to generate the compressed imaged data by compressing the M datasets by using the selected compression process.

In still another aspect of the present invention, an image processing circuit includes: a representative-values calculation circuit configured to generate M datasets each including a plurality of representative values by performing a pre-process on image data associated with the N pixels, M being a natural number more than one and less than N; and an all-combinations comparing compression circuit configured to calculate correlations between two datasets selected from the M datasets for all possible combinations of the two datasets, to select a compression process from a plurality of compression processes in response to the calculated correlations, and to generate the compressed imaged data by compressing the M datasets by using the selected compression process.

In still another aspect of the present invention, an image processing method includes: generating M datasets each including a plurality of representative values by performing a pre-process on image data associated with the N pixels, M being a natural number more than one and less than N; calculating correlations between two datasets selected from the M datasets for all possible combinations of the two datasets; selecting a compression process from a plurality of compression processes in response to the calculated correlations; and generating the compressed imaged data by compressing the M datasets by using the selected compression process.

The present invention provides an image processing circuit and method which effectively reduce the compression error while suppressing the increase in the circuit size, and a display panel driver and display device incorporating the same.

BRIEF DESCRIPTION OF THE DRAWINGS

The above and other advantages and features of the present invention will be more apparent from the following description taken in conjunction with the accompanied drawings, in which:

FIGS. 4A and 4B illustrate a flowchart which depicts contents of a pre-process performed by a 12-representative-values calculation circuit in a first embodiment;

FIGS. 5 to 12 are diagrams illustrating the pre-process performed by the 12-representative-values calculation circuit in the first embodiment with specific numerical examples;

FIG. 13 is a diagram illustrating contents of datasets A, B, C and D in the first embodiment;

FIG. 15 is a table illustrating contents of image data of eight pixels to be reproduced in the first embodiment, in the case that four datasets include the data illustrated in FIG. 12;

FIGS. 17 to 21 are diagrams illustrating the pre-process performed by the 12-representative-values calculation circuit in the second embodiment with specific numerical examples;

FIG. 22 is a diagram illustrating contents of datasets A, B, C and D in the second embodiment;

FIGS. 24 to 25 are diagrams illustrating the decompression process performed by the image decompression circuit in the second embodiment with specific numerical examples;

FIG. 26 is a diagram illustrating an exemplary format of losslessly-compressed data;

FIG. 27 is a diagram illustrating an exemplary format of (1×4) compressed data;

FIG. 28 is a diagram illustrating an exemplary format of (2+1×2) compressed data;

FIG. 29 is a diagram illustrating an exemplary format of (2×2) compressed data; and FIG. 30 is a diagram illustrating an exemplary format of (4×1) compressed data.

DESCRIPTION OF PREFERRED EMBODIMENTS

First, a description is given of an overview of an image compression method used in embodiments of the present invention. In one embodiment of the present invention, an image compression process is performed in units of pixel sets each including N pixels, where N is a natural number equal to or more than three. In the image compression process, a pre-process is first performed on image data of N pixels to generate M datasets, where M is a natural number more than one and less than N. Each dataset includes a plurality of representative values determined based on the image data of the corresponding N pixels. An appropriate compression process is then selected from a plurality of compression processes in response to the correlation among the M datasets and compressed imaged data are finally generated by performing the selected compression process on the M datasets.

In decompressing the compressed image data, a decompression process corresponding to the compression process selected for the M datasets is performed on the finally-obtained compressed image data to reproduce the M datasets. This is followed by performing a post-process corresponding to the above-described pre-process on the M datasets to reproduce the original image data of the N pixels.

Such compression and decompression processes effectively suppress the increase in the circuit size by performing the pre-process, which reduces the number of the possible combinations in the correlation calculation, while reducing the compression error by selecting an appropriate compression process in response to the correlation among the M datasets.

In the following, a detailed description is given of embodiments of the present invention. In the following embodiments, compression processing is disclosed in which a pre-process is performed on image data of eight pixels included in a block to be subjected to the compression processing to thereby generate four data sets each including three representative values and an appropriate compression process is then selected from a plurality of compression processes in response to the correlation among the four datasets. It should be noted that the number of pixels included in the block is not limited to eight. It should be also noted that the number of the datasets generated for the block is not limited to four. It should be also noted that the number of the representative values included in each dataset is not limited to three.

First Embodiment

1. Overall Configuration of Liquid Crystal Display Device

Figure 1:
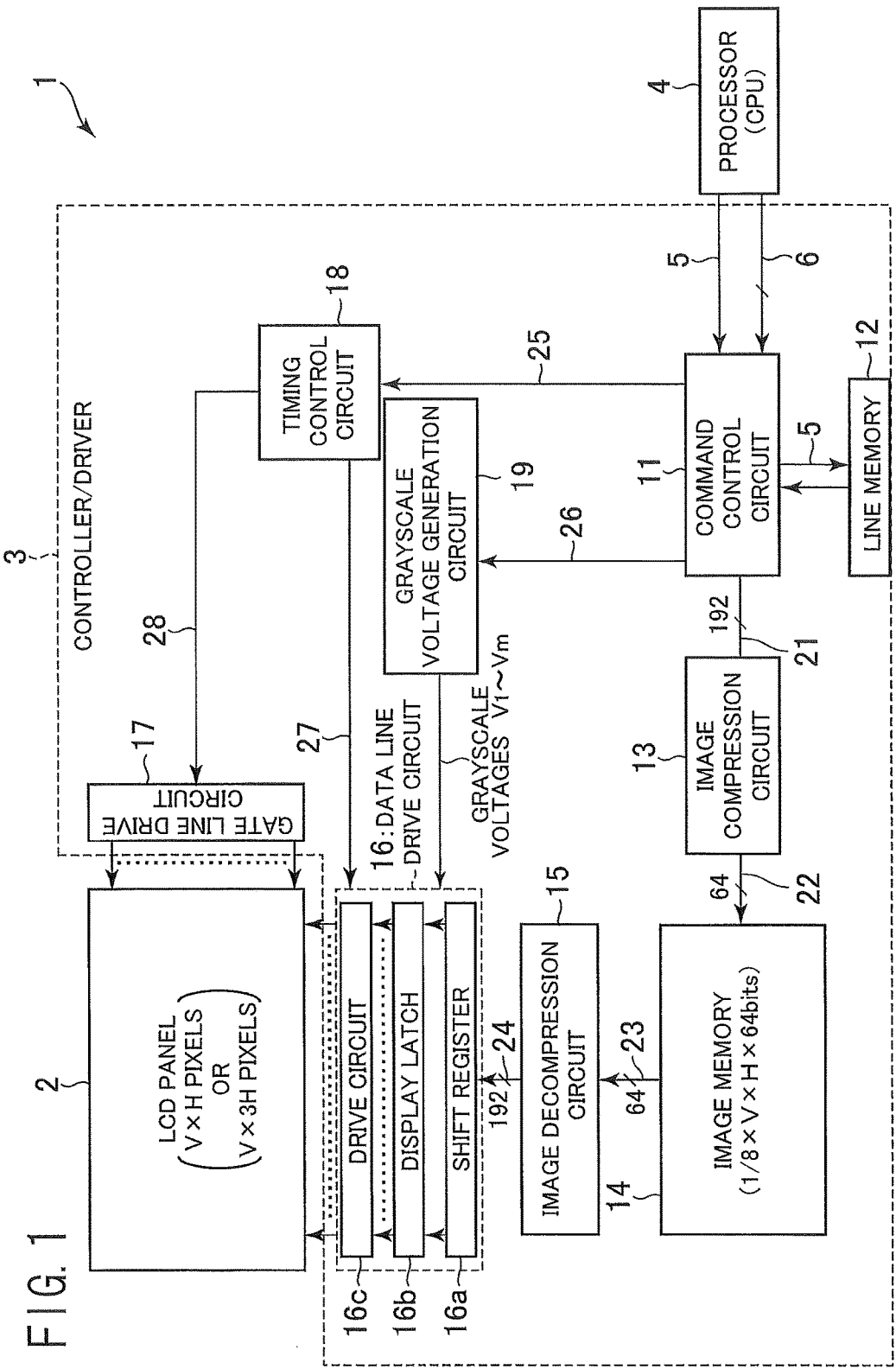
FIG. 1 is a block diagram illustrating an exemplary configuration of a liquid crystal display device in a first embodiment of the present invention.

FIG. 1 is a block diagram illustrating an exemplary configuration of a liquid crystal display device in a first embodiment of the present invention. The liquid crystal display device 1 includes an LCD (liquid crystal display) panel 2 and a controller/driver 3. The LCD pane 2 includes data lines, gate lines and pixels arranged in V rows and H columns. In each horizontal line of the LCD panel 2, H pixels are arrayed. Each pixel includes a subpixel associated with red (referred to as R subpixel, hereinafter), a subpixel associated with green (referred to as G subpixel, hereinafter) and a subpixel associated with blue (referred to as B subpixel, hereinafter). Each subpixel is provided at an intersection of a data line and a gate line. The controller/driver 3 drives respective subpixels within the LCD panel 2 in response to input image data 5 received from a processor 4 to display a desired image. In this embodiment, the input image data 5 represent the grayscale level of each subpixel of each pixel by eight bits, that is, represent the color of each pixel by 24 bits. The operation of the controller/driver 3 is controlled by a set of control signals 6 supplied from the processor 4. A CPU (central processing unit) may be used as the processor 4. The set of control signals 6 may include a dot clock signal DCLK, a horizontal synchronization signal Hsync and a vertical synchronization signal Vsync, for example.

The controller/driver 3 includes a command control circuit 11, a line memory 12, an image compression circuit 13, an image memory 14, an image decompression circuit 15, a data line drive circuit 16, a gate line drive circuit 17, a timing control circuit 18 and a grayscale voltage generation circuit 19.

The command control circuit 11 has the following three functions: First, the command control circuit 11 has the function of supplying to the timing control circuit 18 timing setting data 25 indicating the operation timing of the controller/driver 3, in response to the control signals 6. Second, the command control circuit 11 has the function of supplying to the grayscale voltage generation circuit 19 grayscale setting data 26 which are used to set a desired gamma curve, that is, the relation between the voltage levels of drive voltages fed to the data lines of the LCD panel 2 and the grayscale levels indicated in the input image data 5.

Third, the command control circuit 11 has the function of forwarding the input image data 5 supplied from the processor 4 to the image compression circuit 13. In this operation, the command control circuit 11 forwards the input image data 5 to the image compression circuit 13 in units of pixel sets each consisting of pixels arranged in two rows and four columns (that is, two horizontal lines×four pixels per horizontal line. Since image data are usually transferred to an LCD driver in the order from pixels of the uppermost horizontal line to pixels of the lowermost horizontal line, it is necessary to sort the input image data 5 to transfer the input image data 5 in units of pixel sets each including pixels arranged in two rows and four columns. The command control circuit 11 performs sorting of the input image data 5 by using the line memory 12, which has a capacity sufficient for holding input image data 5 corresponding to pixels of one horizontal line. In FIG. 1, the image data obtained by this sorting are denoted by the numeral 21.

The image compression circuit 13 performs image compression processing on the image data 21 received from the command control circuit 11. The image compression processing is performed in units of pixel sets each consisting of two pixels. In the following, pixels arranged in two rows and four columns, which are a unit of image compression processing, is referred to as a "block" and the block to be subjected to the image compression processing is referred to as a "target block". When image data 21 associated with pixels of a target block are forwarded from the command control circuit 11, the image compression circuit 13 performs image compression processing on the image data 21 to generate compressed image data 22.

In this embodiment, the compressed image data 22 generated by the image compression circuit 13 represent the grayscale levels of eight pixels including in each block with 64 bits. This implies that the image compression processing reduces the data amount down to one third, as the original image data 21 represent the grayscale levels of eight pixels including in each block with 192 (=24×8) bits. That is, the number of bits of compressed image data 22 generated for a certain block is one third of the number of bits of the original image data 21 associated with the block.

The image memory 14 stores the compressed image data 22 generated by the image compression circuit 13. In one embodiment, the image memory 14 has a capacity of (⅛)× V×H×64 bits. The compressed image data read from the image memory 14 are transferred to the image decompression circuit 15. In FIG. 1, the compressed image data read from the image memory 14 are denoted by the numeral 23.

The image decompression circuit 15 decompresses the compressed image data 23 read from the image memory 14 to generate decompressed image data 24. In this embodiment, the decompressed image data 24 are 24-bit data which represent the grayscale level of each of the three subpixels of each pixel with eight bits. Details of the configuration and operation of the image decompression circuit 15 will be described later. The generated decompressed image data 24 are transferred to the data line drive circuit 16.

The data line drive circuit 16 drives the LCD panel 2 in response to the decompressed image data 24 received from the image decompression circuit 15. In detail, the data line drive circuit 16 includes a shift register 16a, a display latch 16b and a drive circuit 16c. The shift register 16a sequentially receives and stores the decompressed image data from the image decompression circuit 15. The shift register 16a has a capacity sufficient for holding decompressed image data associated with H pixels positioned in one horizontal line. The display latch 16b temporarily latches the decompressed image data associated with pixels of one horizontal line (H pixels) hold in the shift register 16a, and forwards the latched decompressed image data to the drive circuit 16c. The operation timings of the shift register 16a and the display latch 16b are controlled by timing control signals 27 fed from the timing control circuit 18. The drive circuit 16c is responsive to the decompressed image data received from the display latch 16b, which correspond to one horizontal line, for driving the corresponding data lines of the LCD panel 2. More specifically, the drive circuit 16c is responsive to the decompressed image data for selecting corresponding grayscale voltages from a plurality of grayscale voltages $V_1$ to $V_m$ supplied from the grayscale voltage generation circuit 19 to drive the corresponding data lines to the selected grayscale voltages.

The gate line drive circuit 17 drives the gate lines of the LCD panel 2. The operation timing of the gate line drive circuit 17 is controlled by timing control signals 28 received from the timing control circuit 18.

The timing control circuit 18 performs overall timing control for the controller/driver 3 in response to the timing setting data 25 received from the command control circuit 11. More specifically, the timing control circuit 18 controls the operation timing of the data line drive circuit 16 by supplying the timing control signals 27 to the data line drive circuit 16, and controls the operation timing of the gate line drive circuit 17 by supplying the timing control signals 28 to the gate line drive circuit 17.

The grayscale voltage generation circuit 19 generates the grayscale voltages $V_1$ to $V_m$ in response to the grayscale setting data 26 received from the command control circuit 11 and supplies the grayscale voltages $V_1$ to $V_m$ to the data line drive circuit 16. The voltage levels of the grayscale voltages $V_1$ to $V_m$ are controlled in response to the grayscale setting data 26.

Figure 2A:
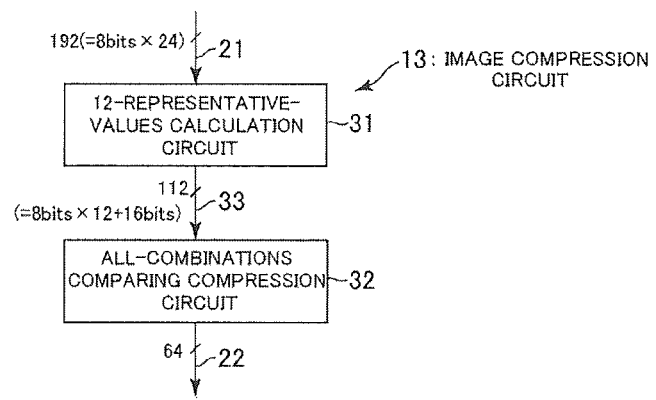
FIG. 2A is a block diagram illustrating an exemplary configuration of an image compression circuit in a first embodiment.

2. Configurations and Operations of Image Compression Circuit and Image Decompression Circuit Next, a description is given of the configurations and operations of the image compression circuit 13 and the image decompression circuit 15. FIG. 2A is a block diagram illustrating an exemplary configuration of the image compression circuit 13. The image compression circuit 13 has the function of generating compressed image data 22 by compressing image data 21 associated with eight pixels (that is, 24 subpixels), which are 192-bit data, into 64-bit data. The image compression circuit 13 includes a 12-representative-values calculation circuit 31 and a all-combinations comparing compression circuit 32.

The 12-representative-values calculation circuit 31 performs the above-described pre-process to generate representative value data 33 from the image data 21 associated with eight pixels (that is, 24 subpixels) of the target block. The representative value data 33 represent image data 21 associated with eight pixels (that is, 24 subpixels) by four datasets and auxiliary data. In this embodiment, each of the four datasets includes three 8-bit representative values. In other words, the representative value data 33 include 12 representative values. The auxiliary data are, on the other hand, 16-bit data. This implies that the representative data 33 are 112 (=8×12+16)-bit data.

As described later in detail, eight pixels are grouped into four groups and these four groups are associated with four datasets, respectively. Three representative values of each dataset are determined as the center value of the grayscale levels of the R subpixels of the pixels associated with the corresponding group, the center value of the grayscale levels of the G subpixels, and the center value of the grayscale levels of the B subpixels, respectively. It should be noted that the center value means the average value of the maximum and minimum values. It should be also noted that a "group" may include only one pixel. Furthermore, no pixel may be grouped into a certain group, depending on the procedure of the grouping (for example, image data associated with all the pixels are identical). In such a case, data of the certain group may be generated by copying data of any other group.

The all-combinations comparing compression circuit 32 selects an appropriate one from a plurality of compression processes in response to the correlation among the four datasets included in the representative value data 33, and generates the compressed image data 22 by performing the selected compression process on the four datasets. The compressed image data 22 are generated so as to include compressed data obtained by the selected compression process and the auxiliary data of the representative value data 33.

Schematically, the compression process is performed in the all-combinations comparing compression circuit 32 as follows: The all-combinations comparing compression circuit 32 calculates the correlations between two datasets for all the possible combination of two datasets selected from four datasets described in the representative value data 33. The all-combinations comparing compression circuit 32 selects an appropriate compression process in response to the calculated correlations and performs the selected compression process on the four datasets. The all-combinations comparing compression circuit 32 generates 64-bit compressed image data 22 by attaching 48-bit data generated by this compression process with the 16-bit auxiliary data included in the representative value data 33. The compressed image data 22 generated by the all-combinations comparing compression circuit 32 are transferred to the image memory 14 and stored in the image memory 14.

In this embodiment, the compression processes allowed to be selected by the all-combinations comparing compression circuit 32 include the following five compression processes: lossless compression, (1×4) compression, (2+1×2) compression, (2×2) compression and (4×1) compression. Details of these five compression processes will be described later in detail.

Figure 3A:
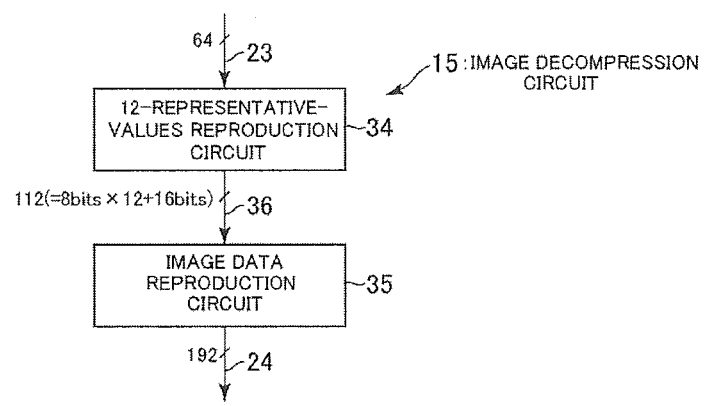
FIG. 3A is a block diagram illustrating an exemplary configuration of an image decompression circuit in a first embodiment.

On the other hand, FIG. 3A is a block diagram illustrating an exemplary configuration of the image decompression circuit 15. The image decompression circuit 15 includes 12-representative-values reproduction circuit 34 and an image data reproduction circuit 35. The 12-representative-values reproduction circuit 34 performs decompression processing corresponding to the compression processing performed in the all-combinations comparing compression circuit 32 and thereby reproduces the four datasets of the representative value data 33. In detail, the 12-representative-values reproduction circuit 34 determines which of the above-described five compression processes is used to generate the compressed image data 23 read from the image memory 14 and reproduces the four datasets of the representative value data 33 by decompressing the compressed image data 23 with the decompression process corresponding to the compression process actually used for generating the compressed image data 23. The 12-representative-values reproduction circuit 34 further outputs representative-value reproduced data 36 which include the four reproduced datasets and the auxiliary data included in the compressed image data 23 (that is, the auxiliary data included in the representative value data 33). In this embodiment, the representative-value reproduced data 36 are 112-bit data, since the four datasets each include three representative values, and each representative value is represented by eight bits, while the auxiliary data are 16-bit data.

The image data reproduction circuit 35 reproduces the original image data of the eight pixels from the four reproduced datasets and the auxiliary data which are included in the representative-value reproduced data 36. The image data reproduction circuit 35 outputs to the data line drive circuit 16 the reproduced image data of the eight pixels as the decompressed image data 24.

Figure 4A:
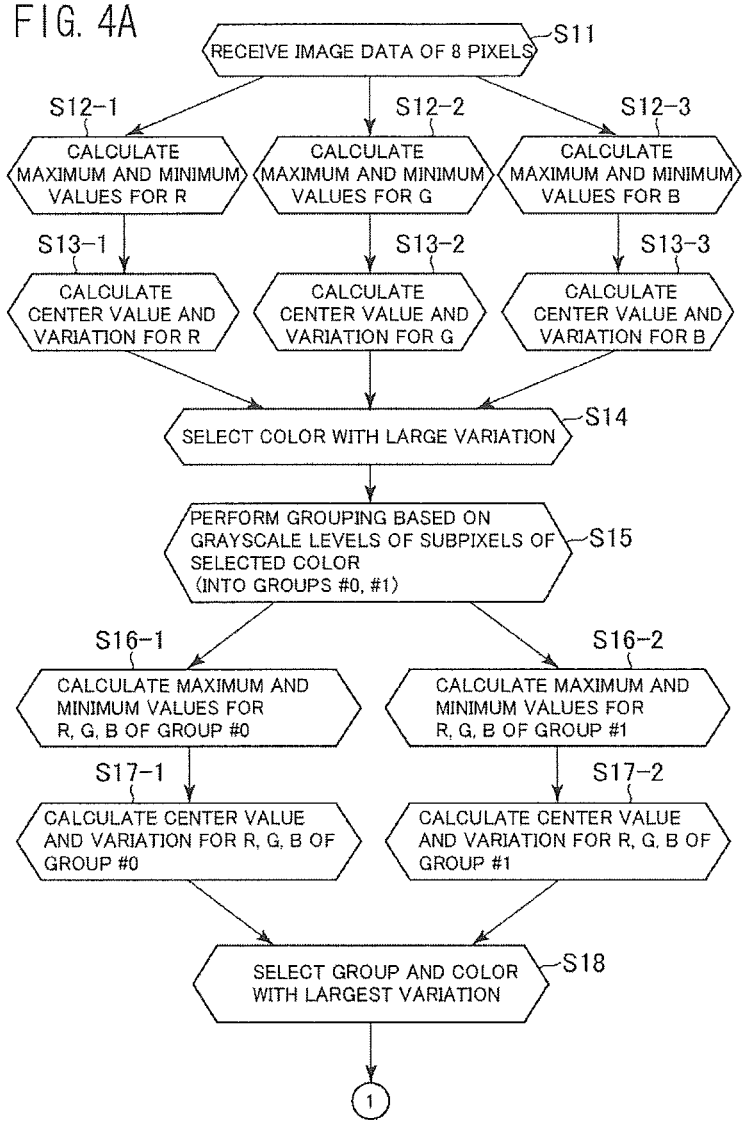

3. Details of Pre-Process Performed in 12-Representative-Values Calculation Circuit Next, a detailed description is given of the pre-process performed by the 12-representative-values calculation circuit 31 of the image compression circuit 13. FIGS. 4A and 4B illustrate a flowchart depicting the contents of the pre-process performed by the 12-representative-values calculation circuit 31 and FIGS. 5 to 12 are diagrams illustrating a specific numerical example of the pre-process performed by the 12-representative-values calculation circuit 31.

In general, the pre-process performed on image data 21 associated with eight pixels of the target block by the 12-representative-values calculation circuit 31 includes the following steps of:

(a) grouping the eight pixels into four groups; and (b) for each of the four groups, calculating the center value of the grayscale levels of the R subpixels of the pixels of each group, the center value of the grayscale levels of the G subpixels and the center value of the grayscale levels of the B subpixels. The calculated center value of the grayscale levels of the R subpixels of the pixels of each group, center value of the grayscale levels of the G subpixels and center value of the grayscale levels of the B subpixels are used as representative values constituting the dataset associated with each group.

In the procedure for grouping the eight pixels into the four groups, the following three processes are repeatedly performed until a desired number of groups are defined by the grouping:

(a1) a process of calculating data indicative of the variation of the grayscale levels of the R subpixels of the pixels which belongs to each group, data indicative of the variation of the grayscale levels of the G subpixels and data indicative of the variation of the grayscale levels of the B subpixels (see steps S12, S13, S16, S17, S20 and S21);

(a2) a process of selecting the combination of the group and color for which the calculated variation is largest (see steps S14, S18 and S22); and (a3) a process of grouping the pixels of the selected group into two groups depending on the grayscale levels of the subpixels of the selected color (see steps S15, S19 and S23). Note that, in the initial state, the above-described processes (a2) and (a3) are first performed, assuming that the eight pixels belong to the single group. In other words, when process (a2) is first performed, there is only one choice for selecting the group and therefore the initially-defined group is automatically selected when process (a3) is first performed.

It should be noted that the group with the largest variation in the grayscale levels is divided in processes (a2) and (a3). Such processes effectively reduce the variation in the pixels included in each group. This implies that information loss is reduced in the case that the center values of the grayscale levels of the R subpixels, G subpixels and B subpixels are used as the representative values, contributing the reduction of the image quality deterioration. In the following, a detailed description is given of the pre-process performed by the 12-representative-values calculation circuit 31.

Referring to FIG. 4A, when the image data 21 associated with eight pixels are inputted to the 12-representative-values calculation circuit 31 (step S11), a process is performed for calculating data indicative of the variation of the grayscale levels of the R subpixels of the eight pixels of interest, data indicative of the variation of the grayscale levels of the G subpixels and data indicative of the variation of the grayscale levels of the B subpixels (steps S12 and S13). More specifically, the maximum and minimum values of the grayscale levels of the R subpixels of the eight pixels of interest are calculated (step S12-1). For example, when the pre-process is performed on the image data associated with the eight pixels #0 to #7 illustrated in FIG. 5, the maximum value Rmax of the grayscale levels of the R subpixels of pixels #0 to #7 is "107" and the minimum value Rmin is "100", as shown in FIG. 6.

Correspondingly, with respect to the eight pixels of interest, the maximum and minimum values of the grayscale levels of the G subpixels and the maximum and minimum values of the grayscale levels of the B subpixels are calculated (steps S12-2 and S12-3). When the pre-process is performed on the image data associated with the eight pixels #0 to #7 illustrated in FIG. 5, the maximum value Gmax of the grayscale levels of the G subpixels of pixels #0 to #7 is "235" and the minimum value Gmin is "200", as illustrated in FIG. 6. On the other hand, the maximum value Bmax of the grayscale levels of the B subpixels of pixels #0 to #7 is "187" and the minimum value Bmin is "97".

Furthermore, the center value R_center (which is defined as the average value of the maximum value and the minimum value) of the grayscale levels of the R subpixels of the eight pixels of interest is calculated and the difference Rdiff between the maximum value and the minimum value is calculated as data indicative of the variation of the grayscale levels of the R subpixels (step S13-1). For the example of FIG. 6, the center value R_center of the grayscale levels of the R subpixels is calculated as "103.5" and the difference Rdiff is calculated as "7".

Correspondingly, the center value G_center (which is defined as the average value of the maximum value and the minimum value) of the grayscale levels of the G subpixels of the eight pixels of interest is calculated and the difference Gdiff between the maximum value and the minimum value is calculated as data indicative of the variation of the grayscale levels of the G subpixels (step S13-2). Furthermore, the center value B_center (which is defined as the average value of the maximum value and the minimum value) of the grayscale levels of the B subpixels of the eight pixels of interest is calculated and the difference Bdiff between the maximum value and the minimum value is calculated as data indicative of the variation of the grayscale levels of the B subpixels (step S13-3).

This is followed by selecting the color for which the variation of the grayscale levels of the subpixels of the eight pixels of interest is largest (step S14). In the example of FIG. 6, Bdiff is larger than Rdiff and Gdiff and this means that the B subpixels exhibit the largest variation in the grayscale levels. Accordingly, the color "B" (blue) is selected in the example of FIG. 6.

This is followed by grouping of the eight pixels of interest depending on the grayscale levels of the subpixels associated with the selected color (step S15). In the example of FIG. 7, the grouping is performed depending on the grayscale levels of the B subpixels, since the color "B" is selected. In detail, pixels selected from the eight pixels of interest including a B subpixel with a grayscale level larger than the center value B_center are grouped into group #0 and pixels including a B subpixel with a grayscale level smaller than the center value B_center are grouped into group #1. Such grouping can be achieved by comparing the grayscale level of the B subpixel of each pixel with the center value B_center of the grayscale values of the B subpixels of the eight pixels of interest. In FIG. 7, an example is illustrated in which the center value B_center of the grayscale values of the B subpixels is 142. In the example illustrated in FIG. 7, pixels #2, #3, #6 and #7, which has a B subpixel with a grayscale level larger than the center value B_center, are grouped into group #0 and pixels #0, #1, #4 and #5, which has a B subpixel with a grayscale level smaller than the center value B_center, are grouped into group #1.

Next, a process for calculating data indicative of the variation of the R subpixels of the pixels grouped into each group, data indicative of the variation of the G subpixels and data indicative of the variation of the B subpixels is performed for each group (steps S16 and S17). More specifically, for the four pixels of group #0, the maximum value Rmax and minimum value Rmin of the grayscale values of the R subpixels, the maximum value Gmax and minimum value Gmin of the grayscale values of the G subpixels, and the maximum value Bmax and minimum value Bmin of the grayscale values of the B subpixels are calculated (step S16-1). Correspondingly, for the four pixels of group #1, the maximum value Rmax and minimum value Rmin of the grayscale values of the R subpixels, the maximum value Gmax and minimum value Gmin of the grayscale values of the G subpixels, and the maximum value Bmax and minimum value Bmin of the grayscale values of the B subpixels are calculated (step S16-2). FIG. 8 illustrates the calculation results of the maximum values and the minimum values with respect to both of groups #0 and #1 for the example illustrated in FIG. 7.

Furthermore, for the four pixels of group #0, the center values R_center, G_center and B_center (each defined as the average value of the maximum and minimum values) of the R subpixels, G subpixels and B subpixels are calculated, and the differences Rdiff, Gdiff and Bdiff between the maximum and minimum values of the grayscale levels of the R subpixels, G subpixels and B subpixels are calculated (steps S17-1). Correspondingly, for the four pixels of group #1, the center values R_center, G_center and B_center (each defined as the average value of the maximum and minimum values) of the R subpixels, G subpixels and B subpixels are calculated, and the differences Rdiff, Gdiff and Bdiff between the maximum and minimum values of the grayscale levels of the R subpixels, G subpixels and B subpixels are calculated (steps S17-2).

This is followed by selecting the combination of the group and color with the largest variation (that is, the difference between the maximum and minimum values) in the grayscale levels of the subpixels (step S18). In the example of FIG. 8, the variation (Bdiff) in the grayscale levels of the B subpixels of the pixels of group #1 is larger than the variations (Rdiff and Gdiff) in the grayscale levels of the R subpixels and the G subpixels of the pixels of group #1 and the variations (Rdiff, Gdiff and Bdiff) in the grayscale levels of the R subpixels, the G subpixels and the B subpixels of the pixels of group #0, and therefore the combination of group #1 and the color "B" is selected.

Next, as illustrated in FIG. 4B, the pixels of the selected group are subjected to grouping depending on the grayscale levels of the subpixels associated with the selected color (step S19). As for the example of FIG. 8, in which the combination of group #1 and the color "B" are selected, as illustrated in FIG. 9, with respect to pixels #0, #1, #4 and #5 of group #1, two pixels having a B subpixel with a grayscale level larger than the center value of the grayscale levels of the B subpixels of the pixels of group #1 are grouped into group #10 and the other two pixels having a B subpixel with a grayscale level smaller than the center value of the grayscale levels of the B subpixels of the pixels of group #1 are grouped into group #11. Such grouping can be achieved by comparing the grayscale value of the B subpixel of each pixel of group #1 with the center value B_center of the grayscale values of the B subpixels of the pixels of group #1. FIG. 9 illustrates an example in which the center value B_center of the grayscale levels of the B subpixels is 114. It should be noted that grouping (that is, a division of the group) is not performed for the unselected group at step S19.

In the same way, the process of calculating data indicative of the variation in the grayscale levels of the R subpixels of the pixels grouped into each group, data indicative of the variation in the grayscale levels of the G subpixels and data indicative of the variation in the grayscale levels of the B subpixels (refer to steps S16 and S17); the process of selecting the combination of the group and color for which the calculated variation is largest (refer to step S18); and the process of grouping the pixels of the selected group into two groups depending on the grayscale levels of the subpixels associated with the selected color (refer to step S19) are repeatedly performed until a desired number of groups are defined by the grouping.

In this embodiment, in which four groups are to be defined, the above-described series of processes are performed once again. In detail, for the four pixels of group #0, the maximum value Rmax and minimum value Rmin of the grayscale levels of the R subpixels, the maximum value Gmax and minimum value Gmin of the grayscale levels of the G subpixels, and the maximum value Bmax and minimum value Bmin of the grayscale levels of the B subpixels are calculated (step S20-1). Correspondingly, the maximum value Rmax and minimum value Rmin of the grayscale levels of the R subpixels, the maximum value Gmax and minimum value Gmin of the grayscale levels of the G subpixels, and the maximum value Bmax and minimum value Bmin of the grayscale levels of the B subpixels are calculated for the two pixels of group #10 (step S20-2), and the maximum value Rmax and minimum value Rmin of the grayscale levels of the R subpixels, the maximum value Gmax and minimum value Gmin of the grayscale levels of the G subpixels, and the maximum value Bmax and minimum value Bmin of the grayscale levels of the B subpixels are calculated for the two pixels of group #11 (step S20-3). FIG. 10 illustrates the calculation results of the maximum values and minimum values with respect to groups #0, #10 and #11 for the example illustrated in FIG. 9.

Furthermore, for the four pixels of group #0, the center values R_center, G_enter and B_center (that is, the average values of the maximum and minimum values) of the grayscale levels of the R subpixels, the G subpixels and the B subpixels are calculated and the differences Rdiff, Gdiff and Bdiff between the maximum and minimum values of the grayscale levels of the R subpixels, the G subpixels and the B subpixels are calculated (step S21-1). Correspondingly, for the two pixels of group #10, the center values R_center, G_center and B_center (that is, the average values of the maximum and minimum values) of the grayscale levels of the R subpixels, the G subpixels and the B subpixels are calculated and the differences Rdiff, Gdiff and Bdiff between the maximum and minimum values of the grayscale levels of the R subpixels, the G subpixels and the B subpixels are calculated (step S21-2). Furthermore, for the two pixels of group #11, the center values R_center, G_center and B_center (that is, the average values of the maximum and minimum values) of the grayscale levels of the R subpixels, the G subpixels and the B subpixels are calculated and the differences Rdiff, Gdiff and Bdiff between the maximum and minimum values of the grayscale levels of the R subpixels, the G subpixels and the B subpixels are calculated (step S21-2).

This is followed by selecting the combination of the group and color for which the variation (that is, the difference between the maximum and minimum values) in the grayscale levels of the subpixels is largest (step S22). In the example of FIG. 10, the combination of group #0 and the color "G" is selected, since the variation (Gdiff) in the grayscale levels of the G subpixels of the pixels of group #0 is larger than the variations in the grayscale levels of the R subpixels and the B subpixels of the pixels of group #0, the variations in the grayscale levels of the R subpixels, the G subpixels and the B subpixels of the pixels of group #10, and the variations in the grayscale levels of the R subpixels, the G subpixels and the B subpixels of the pixels of group #11.

Figures 11, 12:
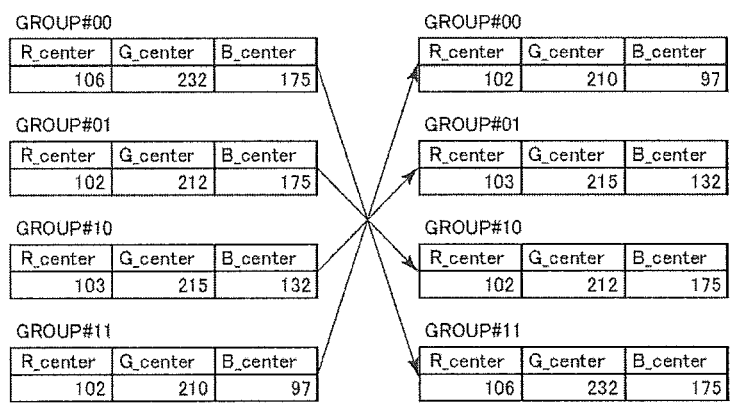

This is followed by grouping of the pixels of the selected group #0 depending on the grayscale levels of the subpixels associated with the selected color "G" (step S23). In the example of FIG. 10, in which the combination of group #0 and the color "G" is selected, as shown in FIG. 11, with respect to pixels #2, #3, #6 and #7 of group #0, two pixels having a G subpixel with a grayscale level larger than the center value of the grayscale levels of the G subpixels of the pixels of group #0 are grouped into group #00 and the other two pixels having a G subpixel with a grayscale level smaller than the center value of the grayscale levels of the G subpixels of the pixels grouped into group #0 are grouped into group #01. Such grouping can be achieved by comparing the grayscale value of the G subpixel of each pixel of group #0 with the center value G_center of the grayscale values of the G subpixels of the pixels of group #0. FIG. 11 illustrates an example in which the center value G_center of the grayscale levels of the G subpixels is 222.

The above-described procedure results in defining four groups #00, #01, #10 and #11. It should be noted that, although four groups are defined by dividing each of groups #0 and #1 into two groups after the eight pixels are grouped into groups #0 and #1 in the above-described procedure, actual implementations are not limited to define four groups with such procedure. For example, group #10 may be divided into groups #100 and #101, when the combination of group #10 and a specific color is selected at step S22 as the combination of the group and color for which the variation in the grayscale levels of the subpixels is largest, from groups #0, #10 and #11. It should be also noted that a group may be defined as consisting only one pixel as a result of the grouping. It should be also noted that, in the case that the image data associated with all the pixels are identical, for example, no pixel may be grouped into a certain group in this embodiment, in which the grouping is achieved by comparison with the center value. In such a case, data of any other group may be copied as data of the certain group.

Next, for each of the four groups, the maximum value Rmax and minimum value Rmin of the grayscale levels of the R subpixels of the pixels of each group, the maximum value Gmax and minimum value Gmin of the grayscale levels of the G subpixels, and the maximum value Bmax and minimum value Bmin of the grayscale levels of the B subpixels are calculated (steps S24-1 to S24-4). Furthermore, for each of the four groups, the center values R_center, G_center and B_center (the average values of the maximum and minimum values) of the grayscale levels of the R subpixels, the G subpixels and the B subpixels of the pixels grouped into each group are calculated (steps S25-1 to S25-4). FIG. 12 illustrates the calculation results of the center values of the grayscale levels of the R subpixels, the G subpixels and the B subpixels with respect to groups #00, #01, #10 and #11, for the example illustrated in FIG. 11.

This is followed by sorting of the groups (step S26). The sorting is performed so that a specific pixel (pixel #0, in this embodiment) belongs to a group identified by a specific group ID (group #00, in this embodiment). Here, a group ID is a serial number identifying a group; in this embodiment, x in the notation "group #x" is the group ID.

This sorting aims at reducing the number of bits of the auxiliary data included in the representative value data 33. Grouping data indicative of which group each pixel belongs to are incorporated into the auxiliary data included in the representative value data 33. The number of bits of the grouping data, that is, the number of bits of the auxiliary data can be reduced by defining the specific pixel (pixel #0, in this embodiment) as belonging to the group identified by the specific ID (group #00, in the present embodiment). In this embodiment, the group which each of pixels #1 to #7 belongs to is identified by two bits. In other words, 14 bits of the auxiliary data are used as the grouping data which describe the group each of pixels #1 to #7 belongs to. The remaining two bits of the auxiliary data may be arbitrarily used; in an actual implementation, the remaining two bits may be used as an identifier which indicates that the compression processing as described in this embodiment (that is, the compression processing in which four datasets are generated by the pre-process and an appropriate compression process is selected from a plurality of compression processes depending on the correlation among the four datasets) is performed.

The center values of the grayscale levels of the R subpixels, the G subpixels and the B subpixels of the pixels which belong to each group, which are calculated with respect to each of the four groups defined as described above, are used as 12 representative values. Here, three data consisting of the center values of the grayscale levels of the R subpixels, the G subpixels and the G subpixels of the pixels of each group are used as one dataset. FIG. 13 is a diagram illustrating contents of the four datasets. The four datasets A to D are associated with groups #00, #01, #10 and #11, respectively. Dataset A consists of the center values of the grayscale levels of the R subpixels, the G subpixels and the B subpixels of the pixels belonging to group #00, and dataset B consists of the center values of the grayscale levels of the R subpixels, the G subpixels and the B subpixels of the pixels belonging to group #01. Correspondingly, dataset C consists of the center values of the grayscale levels of the R subpixels, the G subpixels and the B subpixels of the pixels belonging to group #10, and dataset D consists of the center values of the grayscale levels of the R subpixels, the G subpixels and the B subpixels of the pixels belonging to group #11.

The representative value data 33 are generated by attaching the four datasets defined as described above with the 16-bit auxiliary data. As described above, the auxiliary data include the 14-bit grouping data indicating the group each pixel belongs to.

4. Compression Processing Performed in All-Combinations Comparing Compression Circuit Next, a description is given of the compression processing performed by the all-combinations comparing compression circuit 32 of the image compression circuit 13. As described above, the all-combinations comparing compression circuit 32 selects an appropriate compression process from a plurality of compression processes in response to the correlation among the four datasets described in the representative value data 33, and generates the compressed image data 22 by performing the selected compression process on the four dataset. In this embodiment, an appropriate compression process is selected from lossless compression, (1×4) compression, (2+1×2) compression, (2×2) compression and (4×1) compression, as described above.

Here, the lossless compression is a compression process which allows completely reproducing the original datasets from the compressed image data; in this embodiment, the lossless compression is used in the case that the four datasets to be compressed falls into any of specific patterns. The (1×4) compression is a compression process in which a process of reducing the number of bits (in this embodiment, a dithering using a dither matrix) is individually performed on each of the four datasets to be compressed. The (1×4) compression is advantageous when there is a poor correlation among the four datasets to be compressed.

The (2+1×2) compression is a compression process in which representative values representing data values of two of the four datasets to be compressed are determined and a process of reducing the number of bits (in this embodiment, a dithering using a dither matrix) is individually performed on each of the other two datasets. The (2+1×2) compression is advantageous when the correlation between two of the four datasets is high and the correlation between the other two datasets is poor.

The (2×2) compression is a compression process in which the four datasets to be compressed are grouped into two pairs each including two datasets, and representative values representing the data values are determined for each pair of the datasets. The (2×2) compression is advantageous when the correlation between two of the four datasets is high, and the correlation between the other two datasets is high.

The (4×1) compression is a compression process in which representative values representing the four datasets to be compressed are determined. The (4×1) compression is advantageous when the correlation among all the four datasets to be compressed is high.

Which of the above-described five compression processes is to be used is determined, depending on whether or not the four datasets to be compressed fall into any of specific patterns and the correlations between all the possible combinations of two datasets selected from the four datasets to be compressed. For example, when the correlation among the four datasets is high, the (4×1) compression is used, whereas the (2×2) compression is used when the correlation between two of the four datasets is high, and the correlation between the other two datasets is high.

Figure 2B:
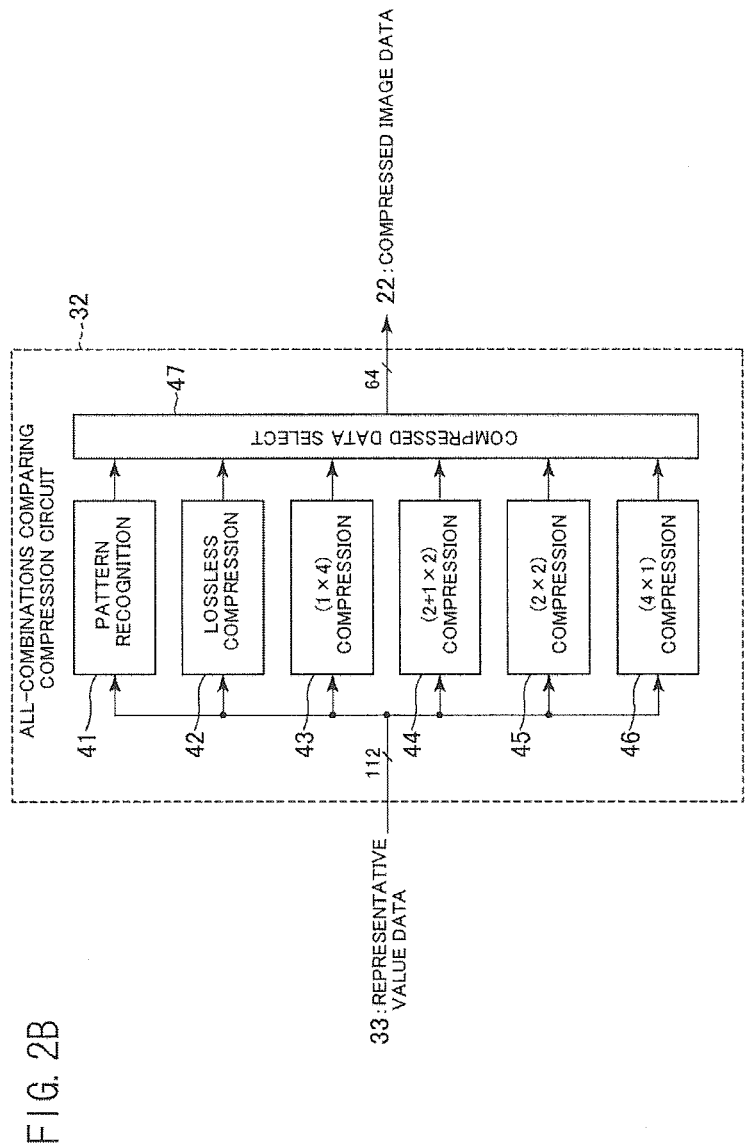
FIG. 2B is a block diagram illustrating an exemplary configuration of an all-combinations comparing compression circuit in a first embodiment.

In order to perform the above-described operation, as shown in FIG. 2B, the all-combinations comparing compression circuit 32 includes a pattern recognition section 41, a lossless compression section 42, a (1×4) compression section 43, a (2+1×2) compression section 44, a (2×2) compression section 45, a (4×1) compression section 46 and a compressed data selection section 47.

The pattern recognition section 41 receives the four datasets of the representative value data 33 and determines which of the above-described five compression processes is to be selected. For example, the pattern recognition section 41 recognizes which combination of datasets offers a high correlation or which dataset exhibits a low correlation with other datasets. Furthermore, the pattern recognition section 41 generates selection data which indicate which of the five compression processes: the lossless compression, the (1×4) compression, the (2+1×2) compression, the (2×2) compression and the (4×1) compression is to be used.

The lossless compression section 42, the (1×4) compression section 43, the (2+1×2) compression section 44, the (2×2) compression section 45 and the (4×1) compression section 46 perform the above-described lossless compression, (1×4) compression, the (2+1×2) compression, the (2×2) compression and the (4×1) compression, respectively, on the four datasets of the representative value data 33, to thereby generate losslessly compressed data, (1×4) compressed data, (2+1×2) compressed data, (2×2) compressed data and (4×1) compressed data.

The compressed data selection section 47 selects any of the losslessly-compressed data, (1×4) compressed data, (2+1×2) compressed data, (2×2) compressed data and (4×1) compressed data on the basis of the selection data received from the pattern recognition section 41 and outputs data generated by attaching the 16-bit auxiliary data included in the representative value data 33 to the selected compressed data as the compressed image data 22. The compressed image data 22 include one or more compression type recognition bits indicating which of the above-described five compression processes is used. The compressed image data 22 outputted from the compressed data selection section 47 are transferred to the image memory 14 and written into the image memory 14.

Figure 14:
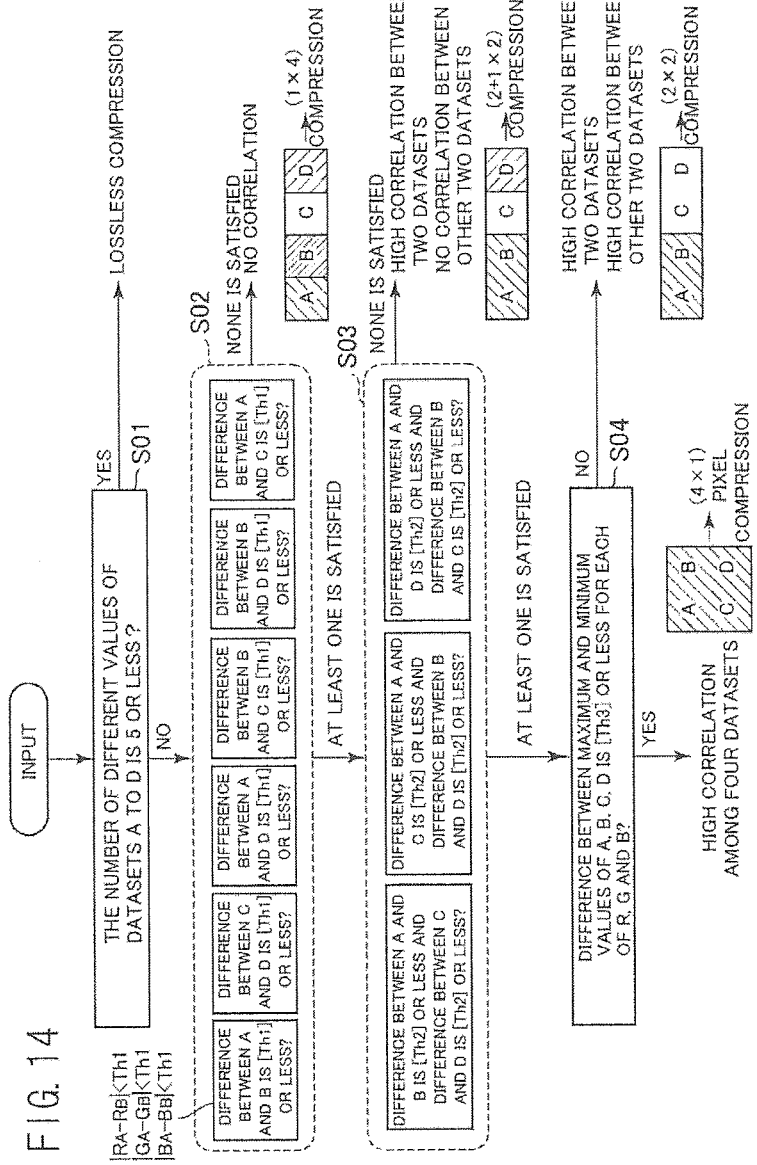
FIG. 14 is a flowchart illustrating an exemplary operation for selecting an appropriate compression process in a pattern recognition section of the all-combinations comparing compression circuit in the first embodiment.

FIG. 14 is a flowchart illustrating an exemplary operation for selecting the appropriate compression process in the pattern recognition section 41 of the all-combinations comparing compression circuit 32. In the following description, the center values of the R subpixels of datasets A, B, C, and D are respectively referred to as R data $R_A$, $R_B$, $R_C$, and $R_D$. Similarly, the center values of the G subpixels of datasets A, B, C, and D are respectively referred to as G data $G_A$, $G_B$, $G_C$, and $G_D$, and the center values of the B subpixels of datasets A, B, C, and D are respectively referred to as B data $B_A$, $B_B$, $B_C$, and $B_D$.

It is first determined whether or not datasets A, B, C and D fall into any of predetermined specific patterns (Step S01), and if datasets A, B, C and D fall into any of the specific patterns, the lossless compression is performed. In this embodiment, predetermined patterns in which the number of different data values of datasets A, B, C and D is five or less are selected as the specific patterns for which the lossless compression is to be performed.

In one example, the lossless compression is performed when datasets A, B, C and D fall into any of the following four patterns (1) to (4):

(1) In the case that datasets A, B, C and D are identical

If datasets A, B, C and D satisfy the following condition (1a), the lossless compression is performed:
Condition (1a)
$R_A=R_B=R_C=R_D$,
$G_A=G_B=G_C=G_D$, and
$B_A=B_B=B_C=B_D$.

In this case, the number of different data values of datasets A, B, C and D is three.

(2) In the case that the three representative values of each of datasets A, B, C and D are identical The lossless compression is performed, also when datasets A, B, C and D satisfy the following conditions (2a):

Condition (2a)
$R_A=G_A=B_A$,
$R_B=G_B=B_B$,
$R_C=G_C=B_C$, and
$R_D=G_D=B_D$.

In this case, the number of different data values of datasets A, B, C and D is four.

(3) In the case that data values of two of R, G and B data are identical for datasets A, B, C and D If any one of the following three conditions (3a) to (3c) is satisfied, the lossless compression is also performed:
Condition (3a)
$G_A=G_B=G_C=G_D=B_A=B_B=B_C=B_D$.
Condition (3b)
$B_A=B_B=B_C=B_D=R_A=R_B=R_C=R_D$.
Condition (3c)
$R_A=R_B=R_C=R_D=G_A=G_B=G_C=G_D$.

In this case, the number of different data values of datasets A, B, C and D is five.

(4) In the case that data values of one of R, G and B data are identical for datasets A, B, C and D and data values of other two data are identical for datasets A, B, C and D Furthermore, if any one of the following three conditions (4a) to (4c) is satisfied, the lossless compression is also performed:
Condition (4a)
$G_A=G_B=G_C=G_D$,
$R_A=B_A$,
$R_B=B_B$,
$R_C=B_C$, and
$R_D=B_D$.
Condition (4b)
$B_A=B_B=B_C=B_D$,
$R_A=G_A$,
$R_B=G_B$,
$R_C=G_C$, and
$R_D=G_D$.
Condition (4c)
$R_A=R_B=R_C=R_D$,
$G_A=B_A$,
$G_B=B_B$,
$G_C=B_C$, and
$G_D=B_D$.

In this case, the number of different data values of datasets A, B, C and D is five.

When the lossless compression is not used, the compression process is selected depending on the correlation among datasets A, B, C and D. More specifically, the pattern recognition section 41 determines which of the following cases datasets A, B, C and D fall into:

Case A:
there are poor correlations among any combinations of two datasets selected from datasets A, B, C and D.

Case B:
there is a high correlation between two of datasets A, B, C and D, there is a poor correlation between the previously-mentioned two datasets and the other two datasets, and there is a poor correlation between the other two datasets each other.

Case C:
there is a high correlation between two datasets of datasets A, B, C and D, and there is a high correlation between the other two datasets.

Case D:
there is a high correlation among datasets A, B, C and D.
Specifically, if the following condition (A) is not satisfied for all the combinations of i and j which meet:

i∈{A, B, C, D},
j∈{A, B, C, D}, and
i≠j,
the pattern recognition section 41 determines that datasets A, B, C and D fall into case A (i.e., there are poor correlations among any combinations of two datasets selected from datasets A, B, C and D) (Step S02).
Condition (A)
|Ri−Rj|≤Th1,
|Gi−Gj|≤Th1, and
|Bi−Bj|≤Th1,
where Th1 is a predetermined threshold value.

When datasets A, B, C and D fall into case A, the pattern recognition section 41 determines to perform the (1×4) compression.

When not determining that datasets A, B, C and D fall into case A, the pattern recognition section 41 defines a first pair of datasets and a second pair of datasets selected from datasets A, B, C and D and, for all the possible combinations of the first and second pairs, determines whether or not the condition is satisfied in which the difference between data values of two datasets belonging to the first pair is smaller than a predetermined value, and the difference between data values of two datasets belonging to the second pair is smaller than the predetermined value.
More specifically, the pattern recognition section 41 determines whether or not any of the following conditions (B1) to (B3) is satisfied (Step S03):
Condition (B1)
|$R_A-R_B$|≤Th2,
|$G_A-G_B$|≤Th2,
|$B_A-B_B$|≤Th2,
|$R_C-R_D$|≤Th2,
|$G_C-G_D$|≤Th2, and
|$B_C-B_D$|≤Th2.
Condition (B2)
|$R_A-R_C$|≤Th2,
|$G_A-G_C$|≤Th2,
|$B_A-B_C$|≤Th2,
|$R_B-R_D$|≤Th2,
|$G_B-G_D$|≤Th2, and
|$B_B-B_D$|≤Th2.
Condition (B3)
|$R_A-R_D$|≤Th2,
|$G_A-G_D$|≤Th2,
|$B_A-B_D$|≤Th2,
|$R_B-R_C$|≤Th2,
|$G_B-G_C$|≤Th2, and
|$B_B-B_C$|≤Th2.
It should be noted that Th2 is a predetermined threshold value.

If none of the above conditions (B1) to (B3) is satisfied, the pattern recognition section 41 determines that datasets A, B, C and D fall into case B (i.e., there is a high correlation between two datasets, there is a poor correlation between the previously-mentioned two datasets and the other two datasets, and there is a poor correlation between the other two pixels each other). In this case, the pattern recognition section 41 determines to perform the (2+1×2) compression.

If the four datasets fall into neither case A nor case B, the pattern recognition section 41 determines whether or not the difference between the maximum and minimum values of the four datasets is smaller than a predetermined value for each of R data, G data and B data of the four datasets. More specifically, the pattern recognition section 41 determines whether or not the following condition (C) is satisfied (Step S04):

Condition (C)
max($R_A$, $R_B$, $R_C$, $R_D$)−min($R_A$, $R_B$, $R_C$, $R_D$)<Th3,
max($G_A$, $G_B$, $G_C$, $G_D$)−min($G_A$, $G_B$, $G_C$, $G_D$)<Th3, and
max($B_A$, $B_B$, $B_C$, $B_D$)−min($B_A$, $B_B$, $B_C$, $B_D$)<Th3.

If condition (C) is not satisfied, the pattern recognition section 41 determines that the four datasets fall into case C (that is, there is a high correlation between two datasets and there is a high correlation between the other two datasets). In this case, the pattern recognition section 41 determines to perform the (2×2) compression.

If condition (C) is satisfied, on the other hand, the pattern recognition section 41 determines that the four datasets fall into Case D (there is a high correlation among the four datasets). In this case, the pattern recognition section 41 determines to perform the (4×1) compression.

The pattern recognition section 41 generates the selection data to indicate which of the (1×4) compression, (2+1×2) compression, (2×2) compression and (4×1) compression is to be used on the basis of the correlation recognition result described above, and sends the selection data to the compressed data selection section 47. As described above, the compressed data selection section 47 is responsive to the selection data received from the pattern recognition section 41 for outputting as the compressed image data 22 any of the losslessly-compressed data outputted from the lossless compression section 42, the (1×4) compressed data outputted from the (1×4) compression section 43, the (2+1×2) compressed data outputted from the (2+1×2) compression section 44, the (2×2) compressed data outputted from the (2×2) compression section 45 and the (4×1) compressed data outputted from the (4×1) compression section 46.

Note that details of the lossless compression, the (1×4) compression, the (2+1×2) compression, the (2×2) compression and the (4×1) compression will be described later.

5. Decompression Processing Performed in 12-Representative-Values Reproduction Circuit The 12-representative-values reproduction circuit 34 determines which of the above-described five compression processes is actually used to generate the compressed image data 23 received from the image memory 14, and decompresses the compression image data 23 by the decompression process corresponding to the compression process actually used to generate the compressed image data 23.

Figure 3B:
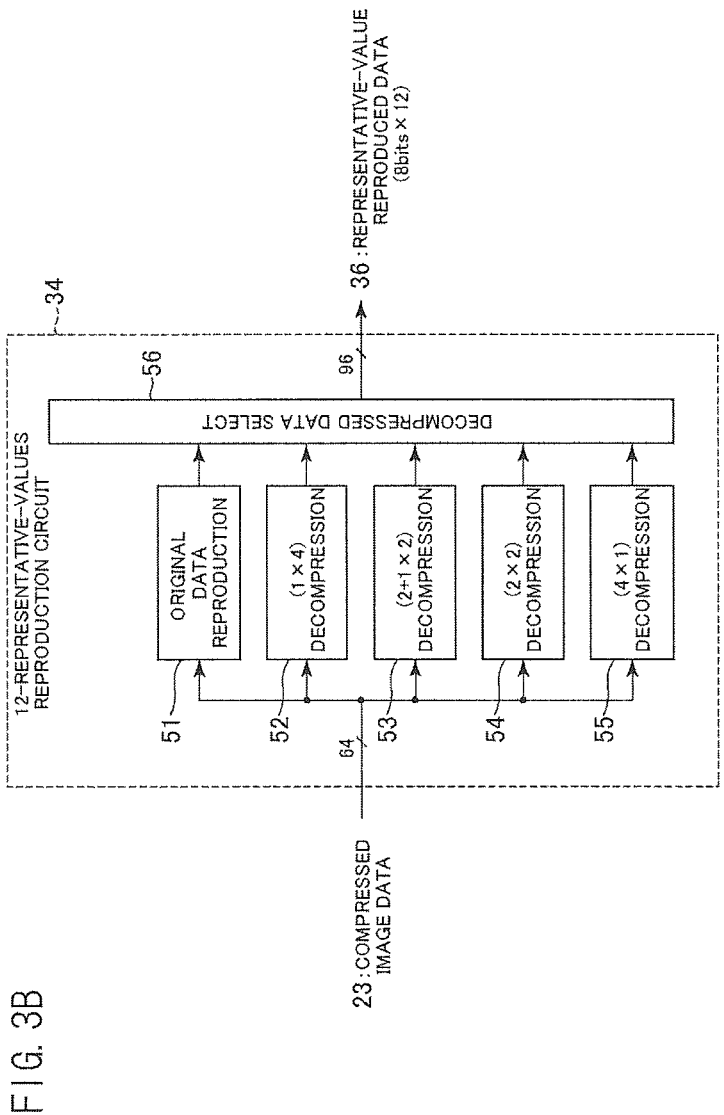
FIG. 3B is a block diagram illustrating an exemplary configuration of a 12-representative-values reproduction circuit in a first embodiment.

In order to achieve such operation, as shown in FIG. 3B, the 12-representative-values reproduction circuit 34 includes an original data reproduction section 51, a (1×4) decompression section 52, a (2+1×2) decompression section 53, a (2×2) decompression section 54, a (4×1) decompression section 55 and a decompressed data selection section 56. The original data reproduction section 51, the (1×4) decompression section 52, the (2+1×2) decompression section 53, the (2×2) decompression section 54, the (4×1) decompression section 55 and the decompressed data selection section 56 respectively have the functions of decompressing the compressed image data 23 generated by the lossless compression, the (1×4) compression, the (2+1×2) compression, the (2×2) compression and the (4×1) compression. The decompressed data selection section 56 recognizes the compression process actually used to generate the compressed image data 23 from the compression type recognition bit(s) included in the compressed image data 23, and selects the decompressed data generated by the decompression process corresponding to the actually-used compression process from the decompressed data outputted from the original data reproduction section 51, the (1×4) decompression section 52, the (2+1×2) decompression section 53, the (2×2) decompression section 54 and the (4×1) decompression section 55. The decompressed data selection section 56 outputs data generated by attaching the 16-bit auxiliary data included in the compressed image data 23 to the selected decompressed data as the representative-value reproduced data 36. This results in that the representative-value reproduced data 36 obtained by the decompression processing performed by the 12-representative-values reproduction circuit 34 include the four reproduced datasets and the 16-bit auxiliary data. Accordingly, the representative-value reproduced data 36 are 112-bit data.

Note that details of the decompressed processes performed in the original data reproduction section 51, the (1×4) decompression section 52, the (2+1×2) decompression section 53, the (2×2) decompression section 54 and the (4×1) decompression section 55 will be described later.

6. Post-Process Performed by Image Data Reproduction Circuit

The image data reproduction circuit 35 performs a process for reproducing the original image data associated with the eight pixels from the four datasets and auxiliary data described in the representative-value reproduced data 36 (such process is referred to as "post-process", hereinafter). The image data reproduction circuit 35 outputs the image data reproduced by the post-process as the decompressed image data 24. In the post-process performed by the image data reproduction circuit 35, the image data of the respective pixels are reproduced by the following procedure.

First, a pixel for which image data are to be reproduced is selected from the eight pixels. In the following, the selected pixel is referred to as the target pixel. Then, the group to which the target pixel belongs to is identified from the auxiliary data. The image data of the target pixel are reproduced by determining the center values of the grayscale levels of the R subpixels, G subpixels and B subpixels described in the dataset associated with the identified group as the grayscale levels of the R subpixels, G subpixels and B subpixels of the target pixel.

FIG. 15 is a table illustrating the contents of the reproduced image data of the eight pixels (that is, the contents of the decompressed image data 24) for the case that the four datasets consists of the data illustrated in FIG. 12. For example, let us consider pixel #0, which belongs to group #00. The image data reproduction circuit 35 recognizes from the auxiliary data of the representative-value reproduced data 36 that pixel #0 belongs to group #00. On the other hand, dataset A, which is associated with group #00, describes that the center values of the R subpixels, G subpixels and B subpixels are "102", "210" and "97", respectively. In this case, the grayscale levels of the R subpixels, G subpixels and B subpixels of pixel #0 are reproduced as "102", "210" and "97", respectively. The similar processes are performed for other pixels #1 to #7 and the decompressed image data 24 are thereby generated.

The decompressed image data 24 are transferred to the data line drive circuit 16 and the data lines of the LCD panel 2 are driven in response to the decompressed image data 24.

As described above, the representative-value data 33 which include four datasets are generated by the image compression circuit 13 by performing the pre-process on image data 21 associated with eight pixels. An appropriate compression process is then selected from a plurality of compression processes in response to the correlation among the four datasets, and the selected compression process is performed on the four datasets of the representative value data 33 to resultantly generate the compressed image data 22.

In the decompression of the compressed image data 23, the decompression process corresponding to the selected compression process is performed on the compressed image data 23, and thereby the representative-value reproduced data 36, which include four datasets, are reproduced. The post-process corresponding to the above-described pre-process is then performed on the four datasets, and thereby the decompressed image data 24, which is a reproduction of the original image data of the eight pixels, are generated.

The above-described compression and decompression processing effectively suppresses an increase in the circuit size by performing the pre-process, which reduce the number of combinations of correlation calculations, and effectively reduces the compression error by selecting the compression process in response to the correlation among the four datasets.

In addition, the pre-process performed in the present embodiment effectively reduces the variation in the pixels included in each group, since the grouping is performed so that the group with the largest variation is divided. This means that less information is lost when the center value of the grayscale levels of the R subpixels and those of the G subpixels and the B subpixels are used as the representative values; this contributes the reduction in the image quality deterioration.

Second Embodiment

Figure 16:
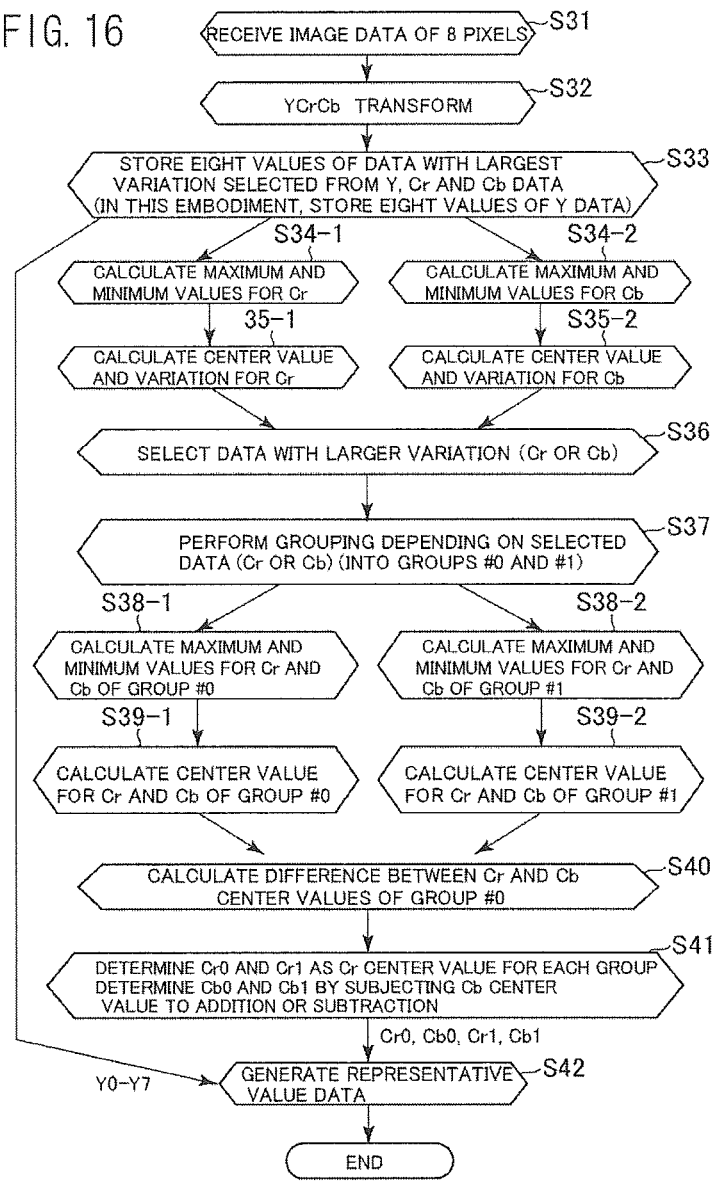
FIG. 16 illustrates a flowchart which depicts contents of a pre-process performed by the 12-representative-values calculation circuit in a second embodiment.
Figure 23:
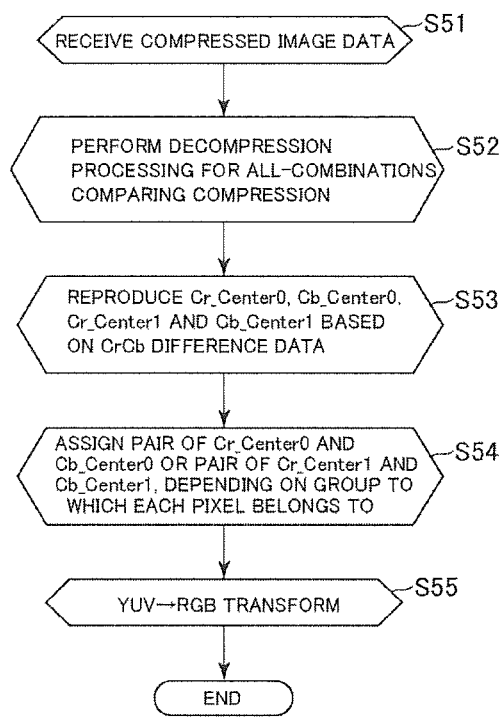
FIG. 23 is a flowchart illustrating contents of a decompression process performed in an image decompression circuit in the second embodiment.

FIG. 16 is a flowchart illustrating the contents of a pre-process performed by the 12-representative-values calculation circuit 31 in a second embodiment of the present invention, and FIGS. 17 to 22 are diagrams illustrating a numerical example of the pre-process performed by the 12-representative-values calculation circuit 31. Also, FIG. 23 is a flowchart illustrating the contents of a post-process performed by the image data reproduction circuit 35, and FIGS. 24 and 25 are diagrams illustrating a numerical example of the post-process performed by the image data reproduction circuit 35.

In the second embodiment, the contents of the pre-process performed by the 12-representative-values calculation circuit 31 and the post-process performed by the image data reproduction circuit 35 are different from those performed in the first embodiment. In the following, a detailed description is given of the pre-process performed by the 12-representative-values calculation circuit 31 and the post-process performed by the image data reproduction circuit 35. Note that the configuration and operation of the liquid crystal display device 1 in the second embodiment are the same as those in the first embodiment except the pre-process performed by the 12-representative-values calculation circuit 31 and the post-process performed by the image data reproduction circuit 35.

In general, the pre-process performed by the 12-representative value calculation circuit 31 includes:

(a) a process of performing a YCrCb transform on image data 21 associated with eight pixels;

(b) a process of generating eight representative values from the data with the largest variation selected from brightness data (Y data) and two types of color difference data (Cr data and Cb data) obtained by the YCrCb transform; and (c) a process of generating two representative values from each of the two other data (that is, generating four representative values in total).

The 12 representative values thus obtained are grouped into four datasets. The four datasets thus defined are then subjected to the compression processing by the all-combinations compression circuit 32 (that is, the process of selecting an appropriate compression process from a plurality of compression processes in response to the correlation among the four datasets) to generate the compressed image data 22. In the following, a description is given of the pre-process performed by the 12-representative-values calculation circuit 31 in the second embodiment.

When image data 21 associated with eight pixels are inputted to the 12-representative-values calculation circuit 31 (step S31), the inputted image data 21 associated with eight pixels are subjected to a YCrCb transform (step S32). In this embodiment, the YCrCb transform is performed for each pixel in accordance with the following equations:

$$Y=R+2G+B, \quad (11a)$$

$$Cr=R-G, \text{ and} \quad (11b)$$

$$Cb=B-G, \quad (11c)$$

where R represents the grayscale level of the R subpixel of each pixel, G represents the grayscale level of the G subpixel of each pixel, and B represents the grayscale level of the B subpixel of each pixel. It should be noted that, as is well known in the art, the YCrCb transform may be achieved by using various equations different from equations (11a) to (11c). FIG. 17 illustrates a specific numerical example of the image data 21 associated with the eight pixels, and FIG. 18 illustrates the Y data, Cr data and Cb data obtained by performing the YCrCb transform in accordance with equations (11a) to (11c) on the image data 21 associated with the eight pixels illustrated in FIG. 17.

The data with the largest variation is then selected from the Y data, the Cr data and the Cb data, and eight representative values are generated from the selected data and then stored (step S33). In detail, for each of the Y data, the Cr data and the Cb data of the eight pixels, the maximum and minimum values are calculated and the difference between the maximum and minimum values is then calculated. The data with the largest difference between the maximum and minimum values are selected as the data with the largest variation, from Y data, the Cr data and the Cb data. For the example illustrated in FIG. 18, since the difference between the maximum and minimum values of the Y data is larger than those of the Cr data and the Cb data, the Y data are selected as the data with the largest variation and the eight representative values are generated from the Y data of the eight pixels and then stored.

In this embodiment, the representative values are defined as 8-bit data, and therefore a process for reducing the number of bits is performed when the bit width of the data selected as the data with the largest variation is larger than eight bits. When the image data 21 describe the grayscale level of each of the R subpixels, the G subpixels and the B subpixels with 8-bit data, for example, the Y data obtained by the above-described equation (11a) are 10-bit data. Accordingly, when the Y data are selected as the data with the largest variation, a process of truncating the lower two bits from the Y data (that is, a process of dividing the values of the Y data by four) is performed. That is, the eight representative values are generated by truncating the lower two bits of the Y data of the eight pixels. In FIG. 16, the eight representative values thus obtained are denoted by the numerals Y0 to Y7.

Furthermore, color transform data are generated which indicate which of the Y data, the Cr data and the Cb data are selected. The color transform data are 2-bit data and incorporated into the representative value data 33 as two bits of the 16-bit auxiliary data.

It should be noted that, although the following description is directed to the case that the Y data are selected as the data with the largest variation, if the Cr data or the Cb data are selected as the data with the largest variation, the processes of the below-described steps S34 to S41 are performed for the remaining two types of data (that is, the Y data and the unselected one of the Cr data and the Cb data).

This is followed by calculating the maximum and minimum values for each of the Cr data and the Cb data (that is, for the remaining two types of data which are not selected at step S33) (steps S34-1 and S34-2). Furthermore, the center value (that is, the average value of the maximum and minimum values) and the variation (that is, the difference between the maximum and minimum values) are calculated for each of the Cr data and the Cb data (steps S35-1 and S35-2). FIG. 19 illustrates the maximum value, minimum value and variation (the difference between the maximum and minimum values) which are calculated for each of the Cr data and Cb data illustrated in FIG. 18. Here, Cr_Max, Cr_Min and Cr_Diff mean the maximum value, minimum value and variation (the difference between the maximum and minimum values) of the Cr data, respectively. Correspondingly, Cb_Max, Cb_Min and Cb_Diff mean the maximum value, minimum value and variation (the difference between the maximum and minimum values) of the Cb data, respectively.

This is followed by selecting the data with a larger variation (that is, the data with a larger difference between the maximum and minimum values), from the Cr data and the Cb data (step S36). In the example of FIG. 19, the Cb data are selected since the variation Cb_Diff of the Cb data is larger than the variation Cr_Diff of the Cr data.

This is followed by performing grouping of the eight pixels depending on the selected data (step S37). In the example of FIG. 20, in which the Cb data are selected, the grouping is performed on the basis of the Cb data. In detail, out of the eight pixels of interest, pixels having a Cb data larger than the center value Cb_center are grouped into group #0 and pixels having a Cb data smaller than the center value Cb_center are grouped into group #1. Such grouping can be achieved by comparing the Cb data of each pixel with the center value Cb_center of the Cb data. FIG. 20 illustrates an example in which the center value Cb_center of the Cb data is 75. In the example of FIG. 20, pixels #0, #4 and #5, which have a Cb data larger than the center value Cb_center, are grouped into group #0 and pixels #1, #2, #3, #6 and #7, which have a Cb data smaller than the center value Cb_center, are grouped into group #1.

It should be noted that, the grouping at step S37 is performed so that a specific pixel (pixel #0, in this embodiment) is unconditionally grouped into group #0. This eliminates the need of storing information indicative of which group pixel #0 belongs to.

Grouping data indicative of the groups into which pixels #1 to #7 are respectively grouped are generated as a result of the grouping at step S37. The grouping data are 7-bit data and incorporated into the representative value data 33 as seven bits of the 16-bit auxiliary data. This is followed by performing a process of calculating the maximum values and minimum values of the Cr data and the Cb data of the pixels which belongs to each group (step S38) and a process of calculating the center values (the average values of the maximum and minimum values) of the Cr data and the Cb data of the pixels which belongs to each group (step S39). More specifically, the maximum value Cr_Max0, the minimum value Cr_Min0 of the Cr data and the maximum value Cb_Max0, the minimum value Cb_Min0 of the Cb data are calculated for the pixels belonging to group #0 (step S38-1). Correspondingly, the maximum value Cr_Max0, the minimum value Cr_Min0 of the Cr data and the maximum value Cb_Max0, the minimum value Cb_Min0 of the Cb data are calculated for the pixels belonging to group #1 (step S38-2). FIG. 21 illustrates the calculation results of the maximum and minimum values of the Cr data and Cb data for each of groups #0 and #1, with respect to the example illustrated in FIG. 20.

Furthermore, the center values Cr_Center0 and Cb_Center0 of the Cr data and Cb data of the pixels belonging to group #0 are calculated (step S39-1). The center values Cr_Center0 and Cb_Center0 are calculated as the average values of the maximum and minimum values of the Cr data and Cb data, respectively, and it holds:

$$Cr\_Center0 = (Cr\_Max0 + Cr\_Min0)/2, \text{ and} \quad (12a)$$

$$Cb\_Center0 = (Cb\_Max0 + Cb\_Min0)/2. \quad (12b)$$

The same goes for group #1. The center values Cr_Center1 and Cb_Center1 of the Cr data and Cb data of the pixels belonging to group #1 are calculated by the following equations (step S39-2):

$$Cr\_Center1 = (Cr\_Max1 + Cr\_Min1)/2, \text{ and} \quad (12c)$$

$$Cb\_Center1 = (Cb\_Max1 + Cb\_Min1)/2. \quad (12d)$$

This is followed by performing a process of determining the remaining four representative values from the center values Cr_Center0 and Cb_Center0 of the Cr data and Cb data of the pixels belonging to group #0 and the center values Cr_Center1 and Cb_Center1 of the Cr data and Cb data of the pixels belonging to group #1. Steps S40 and S41 described below aims at determining the remaining four representative values (note that eight representative values have been already determined from the Y data of the eight pixels).

The center values Cr_Center0 and Cr_Center1 of the Cr data of the pixels belonging to groups #0 and #1 are used as two representative values as they are. In the following, the representative values determined from the center values Cr_Center0 and Cr_Center1 of the Cr data of the pixels belonging to groups #0 and #1 are denoted by symbols Cr0 and Cr1, respectively.
In other words, it holds:

$$Cr0 = Cr\_Center0, \text{ and} \quad (13a)$$

$$Cr1 = Cr\_Center1. \quad (13b)$$

The center values Cb_Center0 and Cb_Center1 of the Cb data, on the other hand, are subjected to an addition/subtraction process so that the result of the addition/subtraction process for the center value Cb_Center0 is close to the value of Cr_Center0, and two values obtained by the addition/subtraction process are used as the remaining two representative values. In the following, the representative values determined from the center values Cb_Center0 and Cb_Center1 of the Cb data of the pixels belonging to groups #0 and #1 are denoted by symbols Cb0 and Cb1, respectively.

In detail, the difference $\Delta CrCb0$ between the center values of the Cr data and Cb data of the pixels belonging to group #0 is first calculated (step S40), where $$\Delta CrCb0 = Cr\_Center0 - Cb\_Center0.$$

Furthermore, a process of adding a parameter value $\eta$, which is determined depending on the difference $\Delta CrCb0$, to the center values Cb_Center0 and Cb_Center1 of the Cb data (Step S41). In other words, the representative values Cr0 and Cr1 are calculated by the following equations:

$$Cb0 = Cb\_Center0 + \eta, \text{ and} \quad (14a)$$

$$Cb1 = Cb\_Center1 + \eta. \quad (14b)$$

Note that the parameter value $\eta$ is allowed to be a negative value. In other words, the process in accordance with equations (14a) and (14b) can be represented as a process of performing an addition or a subtraction on the center values Cb_Center0 and Cb_Center1 of the Cb data.

The parameter value $\eta$ used in equations (14a) and (14b) are determined so that it holds:

$$\eta = m \cdot 2^K, \quad (15a)$$

where m is an integer determined depending on the difference $\Delta CrCb0$ ($=Cr\_Center0 - Cb\_Center0$) and K is a predetermined natural number smaller than the number of bits of the Cr data and Cb data. Note that m may be any of a positive integer, a negative integer or zero. Let us consider the case that the number of bits of the Cr data and Cb data is nine, and K is five, in this embodiment. In this case, equation (15a) can be rewritten to the following equation (15b):

$$\eta = 32 \times m. \quad (15b)$$

In this embodiment, in which the parameter value $\eta$ is determined by equation (15b), the calculations based on equations (14a) and (14b) result in an addition or subtraction of an integral multiple of 32 ($=2^5$).

The parameter m depends on the difference $\Delta CrCb0$ ($=Cr\_Center0 - Cb\_Center0$). More specifically, m is determined as follows:
(A) If $Cr\_center0 \leq Cb\_center$, $$m = [|\Delta CrCb0|/2^K], \text{ and} \quad (16a)$$

(B) if $Cr\_center0 > Cb\_center0$, $$m = -[|\Delta CrCb0|/2^K], \quad (16b)$$

where [x] is the floor function of x, meaning the largest integer not greater than x for a real number x.

The number of bits necessary for representing the parameter m is obtained by adding one to a number obtained by subtracting K defined in equation (5a) from the number of bits of the Cr data and Cb data. In this embodiment, m can be represented as 5-bit data. The parameter m determined by equation (16a) or (16b) is defined as CrCb difference data and the CrCb difference data are incorporated into the representative value data 33 as five bits of the 16-bit auxiliary data.

In the example of FIG. 21, the difference $\Delta CrCb0$ is two. This results in that m is determined as zero and $\eta$ is also determined as zero. Accordingly, it holds:

$$Cb0 = Cb\_Center0, \text{ and} \quad (14a')$$

$$Cb1 = Cb\_Center1. \quad (14b')$$

This means that the center values Cb_Center0 and Cb_Center1 are used as the representative values Cb0 and Cb1 as they are.

Note that, at step S40, the center values Cb_Center0 and Cb_Center1 of the Cb data are subjected to an addition/subtraction process based on the difference $\Delta CrCb0$, which is calculated from the center value Cr_Center0 of the Cr data of the pixels of group #0 and the center value Cb_Center0 of the Cb data. Instead, the center values Cb_Center0 and Cb_Center1 of the Cb data may be subjected to an addition/subtraction process based on the difference $\Delta CrCb1$ which is calculated from the center value Cr_Center1 of the Cr data of the pixels of group #1 and the center value Cb_Center1 of the Cb data. In this case, m is determined depending on the difference ΔCrCb1 (=Cr_Center1−Cb_Center1). More specifically, m is determined as follows:

(A) If Cr_Center1≤Cb_Center1, $$m=[|\Delta CrCb1|/2^K], \text{ and} \quad (16c)$$

(B) if Cr_Center1>Cb_Center1, $$m=-[|\Delta CrCb1|/2^K]. \quad (16c)$$

The 12 representative values (that is, Y0 to Y7, Cr0, Cb0, Cr1, and Cb1) are thus determined by the above-described procedure. Four datasets are defined from these 12 representative values. FIG. 22 is a table illustrating the contents of the four datasets A, B, C and D. Dataset A includes data Y0, Cr0 and Y4, and dataset B includes data Y1, Cb0 and Y5. Also, dataset C includes data Y2, Cr1 and Y6, and dataset D includes data Y3, Cb1 and Y7.

It should be noted that the above-described scheme determines the four datasets A, B, C and D so as to have a relatively high correlation. The variations of Y0 to Y7 are small, because Y0 to Y7 are obtained from the brightness data (Y data) calculated from the image data 21 of the eight pixels arranged in two rows and four columns (this implies the eight pixels are positioned relatively close to one another). The difference between Cr0 and Cr1 is also small, because Cr0 and Cr1 are obtained from the color difference data (Cr data) calculated from the image data 21 of the eight pixels arranged in two rows and four columns. Also, as a result of the calculations at steps S40 and S41, Cr0 and Cb0 are determined so that the difference between Cr0 and Cb0 is small. This results in a reduced loss of information, contributing the reduction of the image quality deterioration.

The representative value data 33 are generated by attaching the 16-bit auxiliary data to the four datasets thus defined. As described above, the auxiliary data include the color transform data (two bits) indicative of which of the Y data, Cr data and Cb data are selected at step S33, the grouping data (seven bits) indicative of the group each pixel belongs to and the CrCb difference data (five bits) indicative of m determined by equations (16a) and (16b). The remaining two bits of the auxiliary data may be used for any purpose. In one example, the remaining two bits of the auxiliary data may be used as an identifier which indicates that the compression processing described in the present embodiment is performed.

The representative value data 33 thus generated are inputted to the all-combinations comparing compression circuit 32 and compression processing is performed on datasets A, B, C and D of the representative value data 33 by the all-combinations comparing compression circuit 32. It should be noted that, in the present embodiment, a correspondence relation is defined between the data included in datasets A, B, C and D of the representative value data 33 and twelve data used as inputs of the all-combinations comparing compression circuit 32 (that is, data $R_A$, $R_B$, $R_C$, $R_D$, $G_A$, $G_B$, $G_C$, $G_D$, $B_A$, $B_B$, $B_C$ and $B_D$). First, data Y0, Y1, Y2 and Y3 of datasets A, B, C and D of the representative value data 33 are used as R data $R_A$, $R_B$, $R_C$ and $R_D$, respectively. Also, data Cr0, Cb0, Cr1 and Cb1 of datasets A, B, C and D of the representative value data 33 are used as G data $G_A$, $G_B$, $G_C$ and $G_D$, respectively. Furthermore, data Y4, Y5, Y6 and Y7 of datasets A, B, C and D of the representative value data 33 are used as B data $B_A$, $B_B$, $B_C$ and $B_D$, respectively. Although R data, G data and B data, which are inputs of the all-combinations comparing compression circuit 32, do not have the technical function of identifying the color in the second embodiment, the all-combinations comparing compression circuit 32 of the second embodiment performs the same calculation process as that of the first embodiment to generate the compressed image data 22. It should be noted that the compressed image data 22 incorporate the auxiliary data included in the representative value data 33.

FIG. 23 is a flowchart illustrating the decompression processing performed on the compressed image data 23 transferred from the image memory 14 in the second embodiment. When the compressed image data 23 transferred from the image memory 14 are first inputted to the image decompression circuit 15 (step S51), the decompression process corresponding to the compression process performed in the all-combinations comparing compression circuit 32 is performed by the 12-representative-values reproduction circuit 34 (step S52). More specifically, the 12-representative-values reproduction circuit 34 determines which of the above-described five compression processes is used to generate the compressed image data 23 transferred from the image memory 14, and performs the decompression process corresponding to the actually-used compression process on the compressed image data 23 to generate the representative-value reproduced data 36. In other words, 12 representative values (that is, Y0 to Y7, Cr0, Cr0, Cr1 and Cb1) are reproduced. Here, the auxiliary data included in the compressed image data 23 are incorporated into the representative-value reproduced data 36 as they are.

Furthermore, the image data reproduction circuit 35 performs a post-process for reproducing the original image data of the eight pixels from the four datasets and auxiliary data described in the representative-value reproduced data 36. The image data reproduction circuit 35 outputs the image data reproduced by the post-process as the decompressed image data 24. In this embodiment, the image data associated with the respective pixels are reproduced in the post-process performed by the image data reproduction circuit 35 as follows:

First, on the basis of the color transform data included in the auxiliary data, the image data reproduction circuit 35 recognizes that the brightness data (Y data) are selected at step S33.

Furthermore, the image data reproduction circuit 35 reproduces the center values Cr_Center0, Cb_Center0, Cr_Center1 and Cb_Center1 of the Cr data and Cb data of the pixels of groups #0 and #1, from Cr0, Cb0, Cr1, Cb1 and the CrCb difference data, which are described in the representative-value reproduced data 36 (step S53). It should be noted that the center values Cr_Center0, Cb_Center0, Cr_Center1 and Cb_Center1 can be reproduced through equations (14a), (14b), (15a) and (15b), since the CrCb difference data indicates the parameter m determined by equations (16a) and (16b).

The image data reproduction circuit 35 then performs a process of reproducing the original Y data, Cr data and Cb data of the eight pixels from data Y0 to Y7 and the center values Cr_Center0, Cb_Center0, Cr_Center1 and Cb_Center1. The reproduction of the original Y data, Cr data and Cb data of the eight pixels is achieved as follows:

First, a pixel for which Y data, Cr data and Cb data are to be reproduced is selected from the eight pixels. In the following, the selected pixel is referred to as the target pixel. This is followed by identifying the group to which the target pixel belongs, on the basis of the auxiliary data. The Cr data and Cb data of the target pixel are reproduced as the pair of the center values of the Cr data and Cb data of the group to which the target pixel belongs (that is, the pair of Cr_Center0 and Cb_Center0 or the pair of Cr_Center1 and Cb_Center1). In addition, the Y data of the target pixel are reproduced from the data corresponding to the target pixel out of data Y0 to Y7. In this embodiment, in which data Yi (where i is an integer from zero to seven) are generated by truncating the lower two bits of the Y data, the Y data of the target pixel are reproduced as the value of four times of the data corresponding to the target pixel out of data Y0 to Y7.

FIG. 24 is a table illustrating the contents of the reproduced Y data, Cr data and Cb data of the eight pixels (that is, the contents of the decompressed image data 24) in the case that the center values of the Cr data and Cb data of groups #0 and #1 are the values illustrated in FIG. 21. Let us consider pixel #0, which belongs to group #0, for example. In this case, the Y data of pixel #0 are reproduced by multiplying data Y0, which corresponds to pixel #0, by four. Furthermore, on the basis of the auxiliary data of the representative-value reproduced data 36, the image data reproduction circuit 35 recognizes that pixel #0 belongs to group #0. The Cr data of pixel #0 are determined as the center value Cr_Center0 of the Cr data calculated for group #0, and the Cb data of pixel #0 are determined as the center value Cb_Center0 of the Cb data calculated for group #0. As a result, the Y data, Cr data and Cb data of pixel #0 are determined as 596, 110 and 108, respectively. The similar processes are performed for other pixels #1 to #7 and thereby the Y data, Cr data and Cb data of pixels #1 to #7 are determined.

This is followed by performing YCrCb-RGB transform on the Y data, Cr data and Cb data of pixels #0 to #7 to generate the decompressed image data 24 associated with pixels #0 to #7 (step S55). The decompressed image data 24 are transferred to the data line drive circuit 16 and the data lines of the LCD panel 2 are driven in response to the decompressed image data 24.

It should be noted that, although the case that the Y data are selected as the data with the largest variation is described in the above, in the case that any of the Cr data or Cb data are selected as the data with the largest variation, the above-described steps S53 to S54 are performed for the remaining two types of data (that is, the Y data and the unselected one of the Cr data and Cb data).

As described above, the representative value data 33 including four datasets are generated by performing the pre-process on the image data 21 of the eight pixels in the image compression circuit 13 also in the present embodiment. Furthermore, an appropriate compression process is selected from a plurality of compression processes in response to the correlation among the four datasets, and the selected compression process is performed on the four datasets of the representative value data 33 to finally generate the compressed image data 22.

In the decompression processing, on the other hand, the decompression process corresponding to the selected compression process is performed on the compressed image data 23 to reproduce the representative-value reproduced data 36, which include four datasets. This is followed by performing the post-process corresponding to the above-described pre-process on the four datasets to generate the decompressed image data 24, to which the original image data of the eight pixels are reproduced.

The above-described compression and decompression processing effectively suppresses an increase in the circuit size by performing the pre-process, which reduce the number of combinations of correlation calculations, and effectively reduces the compression error by selecting the compression process in response to the correlation among the four datasets.

In addition, the four datasets A, B, C and D are determined so as to have a relatively high correlation among one another. The variations among data Y0 to Y7 are relatively small, because data Y0 to Y7 are obtained from the brightness data (Y data) calculated from the image data 21 associated with eight pixels arranged in two rows and four columns. Similarly, the difference between Cr0 and Cr1 is also small, because Cr0 and Cr1 are obtained from the color differential data (Cr data) calculated from the image data 21 associated with the eight pixels arranged in two rows and four columns. Furthermore, as a result of the above-described calculations at steps S40 and S41, the difference between Cr0 and Cb0 is also small. This effectively reduces the loss of information, contributing the reduction of the image quality deterioration.

(Details of Compression Processing in All-Combination Comparing Compression Circuit and Decompression Processing in 12-Representative-Values Reproduction Circuit)

In the following, a detailed description is given of an example of the lossless compression, the (1×4) compression, the (2+1×2) compression, the (2×2) compression and the (4×1) compression and the decompression processes performed on the compressed image data generated by these compression processes in the 12-representative-values reproduction circuit 34.

1. Lossless Compression and Decompression Process Thereof

In the present embodiments, the lossless compression is achieved by rearranging the data values of datasets A, B, C and D. FIG. 26 illustrates an exemplary format of the losslessly-compressed data generated by the lossless compression. In the present embodiments, the losslessly-compressed data are 48-bit data including compression type recognition bits, pattern type data, data #1 to #5 and padding data.

The compression type recognition bits indicate the actually-used compression process and four bits are allocated to the compression type recognition bits in the losslessly-compressed data. In the present embodiments, the value of the compression type recognition bits of the losslessly-compressed data is "1111".

The pattern type data identify a pattern which datasets A, B, C and D fall into. In the present embodiments, in which eight specific patterns (that is, patterns corresponding to the above-described conditions (1a), (2a), (3a) to (3c) and (4a) to (4c), respectively) are defined, the pattern type data are 3-bit data.

Data #1 to #5 are obtained by rearranging data values of datasets A, B, C and D. All of data #1 to #5 are 8-bit data. As described above, the number of different data values of datasets A, B, C and D is equal to or less than five when the lossless compression is selected. This implies that all the data values of datasets A, B, C and D can be contained in data #1 to #5.

The padding data are added to make the number of bits of the losslessly-compressed data equal to compressed image data generated by other compression processes. In the present embodiments, the padding data is one bit.

The decompression of the losslessly-compressed data generated by the above-described lossless compression is achieved by rearranging data #1 to #5 with reference to the pattern type data. Since the pattern type data describe the pattern which datasets A, B, C and D fall into, datasets A, B, C and D can be completely reproduced with no compression error by referring to the pattern type data.

2. (1×4) Compression and Decompression Process Thereof

FIG. 27 is a conceptual diagram illustrating an exemplary format of the (1×4) compressed data. As described above, the (1×4) compression is used in the case when there are poor correlations among all the possible combinations of two datasets selected from the four datasets. In the present embodiments, as illustrated in FIG. 27, the (1×4) compressed data including a compression type recognition bit, $R_A$* data, $G_A$* data, $B_A$* data, $R_B$* data, $G_B$* data, $B_B$* data, $R_C$* data, $G_C$* data, $B_C$* data, $R_D$* data, $G_D$* data and $B_D$* data. In the present embodiments, the (1×4) compressed data are 48-bit data.

The compression type recognition bit indicates the actually-used compression process; in the (1×4) compressed data, one bit is allocated to the compression type recognition bit. In the present embodiments, the value of the compression type recognition bit of the (1×4) compressed data is "0".

The $R_A$* data, $G_A$* data and $B_A$* data are, on the other hand, obtained by performing a bit-reducing process on the R data $R_A$, G data $G_A$ and B data $B_A$ of datasets A, respectively, and the $R_B$* data, $G_B$* data and $B_B$* data are obtained by performing a bit-reducing process on the R data $R_B$, G data $G_B$ and B data $B_B$ of datasets B, respectively. Correspondingly, the $R_C$* data, $G_C$* data and $B_C$* data are obtained by performing a bit-reducing process on the R data $R_C$, G data $G_C$ and B data $B_C$ of datasets C, respectively, and the $R_D$* data, $G_D$* data and $B_D$* data are obtained by performing a bit-reducing process on the R data $R_D$, G data $G_D$ and B data $B_D$ of datasets D, respectively. In this embodiment, only the $B_D$* data associated with the B data of dataset D are 3-bit data, and the others data (that is, the $R_A$*, $G_A$* and $B_A$* data, the $R_B$*, $G_B$* and $B_B$* data, the $R_C$*, $G_C$* and $B_C$* data and the $R_D$* and $G_D$* data) are 4-bit data.

In the following, a description is given of the data processing performed in the (1×4) compression with reference to FIG. 27. In the (1×4) compression, a dithering process using a dither matrix is performed on each of datasets A to D to reduce the number of bits of datasets A to D. More specifically, performed first is a process of adding error data α to each of the R data, G data and B data of datasets A, B, C and D. In this embodiment, the error data α are determined depending on the position of the block for which the compression processing is to be performed (for example, a method using a fundamental matrix, which is a Bayer matrix). In the following, it is assumed that error data α are set to 0, 5, 10 and 15 for datasets A, B, C and D, respectively.

The $R_A$ data, $G_A$ data, $B_A$ data of datasets A, B, C and D to which the error data α are added are subjected to a rounding process and a bit truncation process to thereby generate the $R_A$*, $G_A$*, $B_A$* data, $R_B$*, $G_B$*, $B_B$* data, $R_C$*, $G_C$*, $B_C$* data and $R_D$*, $G_D$* and $B_D$* data. In detail, the B data $B_D$ of datasets D are subjected to a process of adding a value of 16 and then the lower five bits are truncated. The R data, G data and B data of datasets A, B and C and the R data and G data of dataset D are subjected to a process of adding a value of 8 and then the lower four bits are truncated. The (1×4) compressed data are generated by attaching the compression type recognition bit of a value "0" to the $R_A$*, $G_A$*, $B_A$* data, $R_B$*, $G_B$*, $B_B$* data, $R_C$*, $G_C$*, $B_C$* data and $R_D$*, $G_D$* and $B_D$* data thus generated.

In the decompression of the compressed image data generated by the (1×4) compression, a bit carry is first performed on the $R_A$*, $G_A$* and $B_A$* data, the $R_B$*, $G_B$* and $B_B$* data, the $R_C$*, $G_C$* and $B_C$* data and the $R_D$*, $G_D$* and $B_D$* data. In detail, a 5-bit carry is performed on the $B_D$* data associated with the B data of dataset D, and 4-bit carry is performed on the other data (that is, the $R_A$*, $G_A$* and $B_A$* data, the $R_B$*, $G_B$* and $B_B$* data, the $R_C$*, $G_C$* and $B_C$* data and the $R_D$* and $G_D$* data). Furthermore, the error data α are subtracted from the respective data obtained by the bit-carry process to complete the reproduction of the R, G and B data of datasets A to D. This completes the decompression process of the compressed imaged data generated by the (1×4) compression.

3. (2+1×2) Compression and Decompression Process Thereof

FIG. 28 is a conceptual diagram illustrating an exemplary format of the (2+1×2) compressed data. As described above, the (2+1×2) compression is used when there is a high correlation between two datasets, there is a poor correlation between the previously-mentioned two datasets and the other two datasets, and there is a poor correlation between the other two datasets, each other. In this embodiment, as illustrated in FIG. 28, the (2+1×2) compressed data include compression type recognition bits, selection data, an R representative value, a G representative value, a B representative value, additional information data, Ri* data, Gi* data, Bi* data, Rj* data, Gj* data and Bj* data. Here, the (2+1×2) compressed data are 48-bit data, as is the case with the above-described (1×4) compressed data.

The compression type recognition bits indicate the actually-used compression process, and two bits are allocated to the compression type recognition bits in the (2+1×2) compressed data. In the present embodiments, the value of the compression type recognition bits of the (2+1×2) compressed data is "10".

The selection data are 3-bit data indicating which two datasets have a high correlation among datasets A to D. When the (2+1×2) compression is used, two of datasets A to D have a high correlation, and the other two datasets have a poor correlation with the two datasets. Accordingly, the number of possible combinations of the highly-correlated two datasets is six as follows:

Datasets A and C
Datasets B and D
Datasets A and B
Datasets C and D
Datasets B and C
Datasets A and D The selection data indicate, by using three bits, which of these six combinations the highly-correlated two datasets are.

The R, G and B representative values are values representing the R, G and B data of the highly-correlated two datasets, respectively. In the example of FIG. 28, the R and G representative values are each 5-bit or 6-bit data, and the B representative value is 5-bit data.

The additional information data include β comparison result data and magnitude relation data. the β comparison result data indicate whether or not the difference between the R data of the highly-correlated two datasets, and the difference between the G data of the highly-correlated two datasets are larger than a predetermined threshold value β. In this embodiment, the β comparison data are 2-bit data. On the other hand, the magnitude relation data indicate which of the highly-correlated two datasets has the R data with a larger value, and which of the highly-correlated two datasets has the G data with a larger value. The magnitude relation data associated with the R data are generated only when the difference between the R data of the highly-correlated two datasets is larger than the threshold value β, and the magnitude relation data associated with the G data are generated only when the difference between the G data of the highly-correlated two datasets is larger than the threshold value β. Accordingly, the magnitude relation data are 0 to 2-bit data.

The Ri* data, Gi* data, Bi* data, Rj* data, Gj* data, and Bj* data are obtained by performing a process of reducing the number of bits on the R data, G data and B data of the poorly-correlated two datasets, respectively. Note that i and j are two selected from A, B, C and D so that i and j are different from each other. In this embodiment, all of the Ri* data, Gi* data, Bi* data, Rj* data, Gj* data and Bj* data are 4-bit data.

In the following, a description is given of the data processing performed in the (2+1×2) compression with reference to FIG. 28. In the following, a description is given of the case that the correlation between datasets A and B is high, the correlation between datasets C, D and datasets A and B is poor, and the correlation between datasets C and D is poor. The person skilled in the art would easily understand that the (2+1×2) compressed data can be generated in the same manner for different cases.

The compression process of datasets A and B (which have a high correlation) is first described. First, the average values of the R data, G data and B data are calculated for datasets A and B. The average values Rave, Gave and Bave of the R data, G data and B data are calculated by the following equations:

$Rave=(R_A+R_B+1)/2$, $Gave=(G_A+G_B+1)/2$, and $Bave=(B_A+B_B+1)/2$.

Furthermore, the difference $|R_A-R_B|$ between the R data of datasets A and B and the difference $|G_A-G_B|$ between the G data are compared with the predetermined threshold value β. The results of these comparisons are incorporated into the auxiliary data of the (2+1×2) compressed data as the β comparison result data.

Further, the magnitude relation data are described. Furthermore, the magnitude relation data are generated by the following procedure, for the R and G datasets of datasets A and B: When the difference $|R_A-R_B|$ between the R data of datasets A and B is larger than the threshold value β, the magnitude relation data are generated so as to describe which of datasets A and B has the larger R data. When the d difference $|R_A-R_B|$ between the R data of datasets A and B is equal to or smaller than the threshold value β, the magnitude relation data are generated so as not to describe the magnitude relation between the R data of datasets A and B. Similarly, when the difference $|G_A-G_B|$ between the G data of datasets A and B is larger than the threshold value β, the magnitude relation data are generated to describe which of datasets A and B has the larger G data.
When the difference $|G_A-G_B|$ between the G data of datasets A and B is equal to or smaller than the threshold value β, the magnitude relation data are generated so as not to describe the magnitude relation between the G data of datasets A and B.

Subsequently, error data α are added to the average values Rave, Gave, and Bave of the R data, G data and B data. In the present embodiments, the error data α are determined from the position of the block for which the compression processing is performed by using any suitable method (for example, a method of using a fundamental matrix which is a Bayer matrix). In the following, the error data α are assumed as zero for both of datasets A and B.

This is followed by performing a rounding process and a bit truncation process to calculate the R representative value, the G representative value and the B representative value. In detail, the numerical values added to the average value Rave of the R data and the average value Gave of the G data and the numbers of bits truncated in the bit truncation process for the average value Rave of the R data and the average value Gave of the G data depend on the magnitude relations between the differences $|R_A-R_B|$, $|G_A-G_B|$ and the threshold value β. For the average value Rave of the R data, when the difference $|R_A-R_B|$ of the R data is larger than the threshold value β, a value of four is added to the average value Rave of the R data and then the lower three bits of the average value Rave of the R data are truncated to calculate the R representative value. Otherwise, a value of two is added to the average value Rave of the R data and then the lower two bits of the average value Rave of the R data are truncated to calculate the R representative value. The same goes for the average value Gave of the G data. When the difference $|G_A-G_B|$ of the G data is larger than the threshold value β, a value of four is added to the average value Gave of the G data and then the lower three bits of the average value Gave of the G data are truncated to calculate the G representative value. Otherwise, a value of two is added to the average value Gave of the G data and then the lower two bits of the average value Gave of the G data are truncated to calculate the G representative value.

For the B representative value, on the other hand, a value of four is added to the average value Bave of the B data and then the lower three bits of the average value Bave of the B data are truncated to calculate the B representative value. This completes the compression processing for datasets A and B.

For datasets C and D (which are poorly correlated), on the other hand, the same process as the (1×4) compression is performed. That is, a dither process using a dither matrix is independently performed on each of data C and D, to thereby reduce the number of bits of each of the R data, G data and B data of datasets C and D. In detail, a process of adding error data α to each of the R data, G data and B data of datasets C and D is first performed. As described above, the error data α for each datasets are calculated from the position of the block for which the compression processing is performed. In the following, the error data α determined for datasets C and D are assumed as 10 and 15, respectively.

A rounding process and a bit truncation process are then performed to generate the $R_C^*$ data, $G_C^*$ data, $B_C^*$ data, $R_D^*$ data, $G_D^*$ data and $B_D^*$ data. In detail, a value of eight is added to each of the R, G and B data of each of datasets C and D, and then the lower four bits are truncated from each of the R, G and B data of each of datasets C and D. As a result, the $R_C^*$ data, $G_C^*$ data, $B_C^*$ data, $R_D^*$ data, $G_D^*$ data and $B_D^*$ data are calculated.

The (2+1×2) compressed data are finally generated by attaching the compression type recognition bits and the selection data to the R, G, and B representative values, the additional information data, the $R_C^*$ data, $G_C^*$ data, $B_C^*$ data, $R_D^*$ data, $G_D^*$ data and $B_D^*$ data, which are generated as described above.

The decompression processing of the compressed image data generated by the (2+1×2) compression is achieved as follows: In the following, a description is given of the case that datasets A and B have a high correlation each other, datasets C and D have a poor correlation with datasets A and B, and datasets C, D have a poor correlation each other. The person skilled in the art would understand that the (2+1×2) compressed data can be decompressed in the similar manner for other cases.

First, a description is given of the decompression process for datasets A and B (which are highly correlated). A bit carry process is first performed on each of the R, G and B representative values. Here, for the R and G representative values, the number of bits of the bit carry process depends on the magnitude relation between the differences $|R_A-R_B|$ and $|G_A-G_B|$ and the threshold value β, which is described in the β comparison result data. When the difference $|R_A-R_B|$ between the R data is larger than the threshold value β, a 3-bit carry process is performed on the R representative value, otherwise a 2-bit carry process is performed. Similarly, when the difference $|G_A-G_B|$ between the G data is larger than the threshold value β, a 3-bit carry process is performed on the G representative value, otherwise a 2-bit carry process is performed.

Furthermore, after the error data α are subtracted from the corresponding R, G, and B representative values, the grayscale levels of the R data, G and B data of datasets A and B are reproduced from the R, G, and B representative values.

The β comparison result data and the magnitude relation data, which are included in the additional information data, are used in the reproduction of the R data of datasets A and B. When the β comparison result data describe that the difference $|R_A-R_B|$ between the R data is larger than the threshold value β, the value obtained by adding a constant value (for example, five) to the R representative value is reproduced as the R data of the dataset which is described as having a larger R data in the magnitude relation data, and the value obtained by subtracting the constant value from the R representative value is reproduced as the R data of the other dataset which is described as having a smaller R data in the magnitude relation data. When the difference $|R_A-R_B|$ between the R data is smaller than the threshold value β, on the other hand, the R data of datasets A and B are both reproduced as a value identical to the R representative value.

The same process is performed for the reproduction of the G data of datasets A and B, using the β comparison data and the magnitude relation data. In the reproduction of the B data of datasets A and B, on the other hand, the B data of datasets A and B are both reproduced as a value identical to the B representative value, independently of the β comparison data and the magnitude relation data.

This completes the reproduction of the R data, G data and B data of datasets A and B.

In the decompression process for datasets C and D (which are poorly correlated), on the other hand, the same process as the above-described decompression process of the (1×4) compression is performed. In the decompression process for datasets C and D, a 4-bit carry process is first performed on each of the $R_C^*$ data, $G_C^*$ data, $B_C^*$ data, $R_D^*$ data, $G_D^*$ data and $B_D^*$ data. The error data α are then subtracted from the data obtained by the 4-bit carry process to thereby reproduce the R data, G data and B data of datasets C and D.

As a result of the above-described procedure, the reproduction of all of datasets A to D is completed. In other words, the decompression process of the compressed image data generated by the (2+1×2) compression is completed.

4. (2×2) Compression and Decompression Process Thereof

FIG. 29 is a conceptual diagram illustrating an exemplary format of the (2×2) compressed data. As described above, the (2×2) compression is used in the case that there is a high correlation between two datasets, and there is a high correlation between the other two datasets. In the present embodiments, as illustrated in FIG. 29, the (2×2) compressed data are 48-bit data including: compression type recognition bits, selection data, R representative value #1, G representative value #1, B representative value #1, R representative value #2, G representative value #2, B representative value #2 and additional information data.

The compression type recognition bits indicate the actually-used compression process, and three bits are allocated to the compression type recognition bits in the (2×2) compressed data. In this embodiment, the value of the compression type recognition bits of the (2×2) compressed data is "110".

The selection data are 2-bit data indicating which two of the pixels A to D have a high correlation between the corresponding image data. In the case that the (2×2) compression is used, there is a high correlation between image data of two of the pixels A to D, and there is a high correlation between image data of the other two pixels. Accordingly, the number of combinations of two pixels having a high correlation between the corresponding image data is three as follows:

The correlation between the pixels A and B is high, and the correlation between the pixels C and D is high.

The correlation between the pixels A and C is high, and the correlation between the pixels B and D is high.

The correlation between the pixels A and D is high, and the correlation between the pixels B and C is high.

The selection data indicates with 2 bits which of these three combinations the correlations of the image data of the target block fall into.

The R representative value #1, G representative value #1 and B representative value #1 are values representing the R data, G data and B data of a first pair of datasets which are highly-correlated, and the R representative value #2, G representative value #2 and B representative value #2 are values representing the R data, G data and B data of a second pair of datasets which are highly-correlated. In the example of FIG. 29, each of the R representative value #1, G representative value #1, B representative value #1, R representative value #2 and B representative value #2 is 5-bit or 6-bit data, and the G representative value #2 is 6-bit or 7-bit data.

The additional information data include β comparison result data and magnitude relation data. The β comparison result data indicate whether or not the difference between the R data of each pair of the highly-correlated datasets, the difference between the G data of each pair of the highly correlated datasets, and the difference between the B data of each pair of the highly-correlated datasets are larger than the predetermined threshold value β. In the present embodiments, the β comparison result data are 6-bit data in which three bits are allocated to each of the first and second pairs of highly-correlated datasets. On the other hand, the magnitude relation data indicate which of the two highly-correlated datasets has a larger R data, which of two highly-correlated datasets has a larger G data and which of two highly-correlated datasets has a larger B data, for each of the first and second pairs of datasets. For each pair of datasets, the magnitude relation data associated with the R data are generated only in the case that the difference between the R data of the pair of datasets is larger than the threshold value β. Correspondingly, the magnitude relation data associated with the G data are generated only in the case that the difference between the G data of each pair of datasets is larger than the threshold value β; and the magnitude relation data associated with the B data are generated only in the case that the difference between the B data of each pair of datasets is larger than the threshold value β. Accordingly, the magnitude relation data are 0- to 6-bit data.

The data processing in the (2×2) compression is described below with reference to FIG. 29. In the following, a description is given of the case that the correlation between datasets A and B is high, and the correlation between datasets C and D is also high. Datasets A and B are defined as the first pair of datasets, and datasets C and D are defined as the second pair of datasets. The person skilled in the art would understand that the (2×2) compressed data can be generated in the same manner for other cases.

The average values of the R data, G data and B data are first calculated for each pair of datasets. In detail, the average values Rave1, Gave1 and Bave1 of the R data, G data and B data of datasets A and B, and the average values Rave2, Gave2 and Bave2 of the R data, G data and B data of datasets C and D are calculated by the following equations:

$Rave1=(R_A+R_B+1)/2,$ $Gave1=(G_A+G_B+1)/2,$ $Bave1=(B_A+B_B+1)/2,$ $Rave2=(R_C+R_D+1)/2,$ $Gave2=(G_C+G_D+1)/2,$ and $Bave2=(B_C+B_D+1)/2.$ The difference $|R_A-R_B|$ between the R data of datasets A and B, the difference $|G_A-G_B|$ between the G data and the difference $|B_A-B_B|$ between the B data are then compared with the predetermined threshold value β. Similarly, the difference $|B_C-R_D|$ between the R data of datasets C and D, the difference $|G_C-G_D|$ between the G data and the difference $|B_C-B_D|$ between the B data are compared with the predetermined threshold value β. The results of these comparisons are incorporated in the additional information data of the (2×2) compressed data as the β comparison result data.

Furthermore, the magnitude relation data are generated for each of the first pair of datasets A and B and the second pair of datasets C and D. The generated magnitude relation data are incorporated in the additional information data of the (2×2) compressed data.

In detail, when the difference $|R_A-R_B|$ between the R data of datasets A and B is larger than the threshold value β, the magnitude relation data are generated to describe which of datasets A and B has a larger R data. When the difference $|R_A-R_B|$ between the R data of datasets A and B is equal to or smaller than the threshold value β, the magnitude relation data are generated so as not to describe the magnitude relation between the R data of datasets A and B. Similarly, when the difference $|G_A-G_B|$ between the G data of datasets A and B is larger than the threshold value β, the magnitude relation data are generated to describe which of datasets A and B has a larger G data. When the difference $|G_A-G_B|$ between the G data of datasets A and B is equal to or smaller than the threshold value β, the magnitude relation data are generated so as not to describe the magnitude relation between the G data of datasets A and B. In addition, when the difference $|B_A-B_B|$ between the B data of datasets A and B is larger than the threshold value β, the magnitude relation data are generated to describe which of datasets A and B has a larger B data. When the difference $|B_A-B_B|$ between the B data of datasets A and B is equal to or smaller than the threshold value β, the magnitude relation data are generated so as not to describe the magnitude relation between the B data of datasets A and B.

Correspondingly, when the difference $|R_C-R_D|$ between the R data of datasets C and D is larger than the threshold value β, the magnitude relation data are generated to describe which of datasets C and D has a larger R data. When the difference $|R_C-R_D|$ between the R data of datasets C and D is equal to or smaller than the threshold value β, the magnitude relation data are generated so as not to describe the magnitude relation between the R data of datasets C and D. Similarly, when the difference $|G_C-G_D|$ between the G data of datasets C and D is larger than the threshold value β, the magnitude relation data are generated to describe which of datasets C and D has a larger G data. When the difference $|G_C-G_D|$ between the G data of datasets C and D is equal to or smaller than the threshold value β, the magnitude relation data are generated so as not to describe the magnitude relation between the G data of datasets C and D. In addition, when the difference $|B_C-B_D|$ between the B data of datasets C and D is larger than the threshold value β, the magnitude relation data are generated to describe which of datasets C and D has a larger B data. When the difference $|B_C-B_D|$ between the B data of datasets C and D is equal to or smaller than the threshold value β, the magnitude relation data are generated so as not to describe the magnitude relation between the B data of datasets C and D.

Furthermore, error data α are added to the average values Rave1, Gave1 and Bave1 of the R data, G data and B data of datasets A and B, and the average values Rave2, Gave2 and Bave2 of the R data, G data and B data of datasets C and D. In the present embodiments, the error data α are determined using a fundamental matrix, which is a Bayer matrix, from the position of the block for which the compression processing is to be performed. In the following, the error data α determined for the pixels A and B are assumed to be zero.

A rounding process and a bit truncation process are then performed to calculate the R representative value #1, G representative value #1, B representative value #1, R representative value #2, G representative value #2 and B representative value #2.

For datasets A and B, the value which is added in the rounding process and the number of bits truncated in the bit truncation process is selected between two bits and three bits, depending on the magnitude relation between the difference $|R_A-R_B|$ and the threshold value β, the magnitude relation between the difference $|G_A-G_B|$ and the threshold value β, and the magnitude relation between the difference $|B_A-B_B|$ and the threshold value β. When the difference $|R_A-R_B|$ between the R data of datasets A and B is larger than the threshold value β, a value of four is added to the average value Rave1 of the R data, and then the lower three bits are truncated from the average value Rave1 to thereby calculate the R representative value #1. Otherwise, a value of two is added to the average value Rave1 and then the lower two bits are truncated from the average value Rave1 to thereby calculate the R representative value #1. As a result, the R representative value #1 is 5-bit or 6-bit data. The same goes for the G data and B data. When the difference $|G_A-G_B|$ between the G data of datasets A and B is larger than the threshold value β, a value of four is added to the average value Gave1 of the G data, and then the lower three bits are truncated from the average value Gave1 to thereby calculate the G representative value #1. Otherwise, a value of two is added to the average value Gave1 and then the lower two bits are truncated from the average value Gave1 to thereby calculate the G representative value #1. Furthermore, when the difference $|B_A-B_B|$ between the B data of datasets A and B is larger than the threshold value β, a value of four is added to the average value Bave1 of the B data, and then the lower three bits are truncated from the average value Bave1 to thereby calculate the B representative value #1. Otherwise, a value of two is added to the average value Bave1 and then the lower two bits are truncated from the average value Bave1 to thereby calculate the B representative value #1.

The similar process is performed for the pair of datasets C and D to calculate the R representative value #2, G representative value #2 and B representative value #2. For the G data of datasets C and D, however, the value which is added in the rounding process and the number of bits truncated in the bit truncation process are one bit or two bits. When the difference $|G_C-G_C|$ between the G data of datasets C and D is larger than the threshold value β, a value of two is added to the average value Gave2 of the G data, and then the lower two bits are truncated from the average value Gave2 to thereby calculate the G representative value #2. Otherwise, a value of one is added to the average value Gave2 and then the lower one bit is truncated from the average value Gave2 to thereby calculate the G representative value #2.

The above-described procedure completes the (2×2) compression.

On the other hand, the decompression processing of the compressed image data generated by the (2×2) compression is achieved as follows. In the following, a description is given of the decompression of the (2×2) compressed data for the case that the correlation between datasets A and B is high, and the correlation between datasets C and D is high. The person skilled in the art would understand that the (2×2) compressed data can be decompressed in the similar manner for other cases.

First, a bit carry process is first performed on the R representative value #1, the G representative value #1 and the B representative value #1. The number of bits of the bit carry process is determined depending on the magnitude relation between the threshold value β and the differences $|R_A-R_B|$, $|G_A-G_B|$ and $|B_A-B_B|$ of the R data, G data and B data of datasets A and B, which are described in the β comparison result data. When the difference $|R_A-R_B|$ between the R data of datasets A and B is larger than the threshold value β, a 3-bit carry process is performed on the R representative value #1, and otherwise a 2-bit carry process is performed on the R representative value #1. When the difference $|G_A-G_B|$ between the G data of datasets A and B is larger than the threshold value β, a 3-bit carry process is performed on the G representative value #1, and otherwise a 2-bit carry process is performed on the G representative value #1. Furthermore, when the difference $|B_A-B_B|$ between the B data of datasets A and B is larger than the threshold value β, a 3-bit carry process is performed on the B representative value #1, and otherwise a 2-bit carry process is performed on the B representative value #1.

The similar bit carry process is performed on the R representative value #2, the G representative value #2 and the B representative value #2. It should be noted, however, that the number of bits of the bit carry process for the G representative value #2 is selected between one bit and two bit. When the difference $|G_C-G_D|$ between the G data of datasets C and D is larger than the threshold value β, a 2-bit carry process is performed on the G representative value #2, and otherwise a 1-bit carry process is performed on the G representative value #2.

Furthermore, the error data α are subtracted from each of the R representative value #1, G representative value #1, B representative value #1, R representative value #2, G representative value #2, B representative value #2, and then a process is performed for reproducing the R data, G data and B data of datasets A to D from the resultant representative values.

In the reproduction of the R data, G data and B data, the β comparison result data and the magnitude relation data are used. If the β comparison result data describe that the difference $|R_A-R_B|$ between the R data of datasets A and B is larger than the threshold value β, the value obtained by adding a constant value (for example, five) to the R representative value #1 is reproduced as the R data of one of datasets A and B, which is described as having a larger R data in the magnitude relation data, and the value obtained by subtracting the constant value from the R representative value #1 is reproduced as the R data of the other one, which is described as having a larger R data in the magnitude relation data. If the difference $|R_A-R_B|$ between the R data of datasets A and B is smaller than the threshold value β, the R data of datasets A and B are reproduced as the value identical to the R representative value #1. In addition, the G data and B data of datasets A and B, and the R data, G data and B data of datasets C and D are also reproduced by the same procedure.

The above-described procedure completes the reproduction of the R data, G data and B data of datasets A to D. In other words, the decompression processing of the compressed image data generated by the (2×2) compression is achieved.

5. (4×1) Compression and Decompression Process Thereof

FIG. 30 is a conceptual diagram illustrating an exemplary format of the (4×1) compressed data. As described above, the (4×1) compression is used in the case that there is a high correlation among the four datasets. In the present embodiments, as shown in FIG. 30, the (4×1) compressed data are 48-bit data, including compression type recognition bits and the following seven types of data: Ymin, Ydist0 to Ydist2, address data, Cb' and Cr'.

The compression type recognition bits indicate the actually-used compression process, and four bits are allocated to the compression type recognition bits in the (4×1) compressed data. In the present embodiments, the value of the compression type recognition bits is "1110".

Ymin, Ydist0 to Ydist2, the address data, Cb' and Cr' are obtained by performing YUV transform on the R data, G data and B data of datasets A to D to obtain YUV data, and performing compression processing on the YUV data. Here, Ymin and Ydist to Ydist2 are obtained from the brightness data of the YUV data of the four datasets, and Cb' and Cr' are obtained from the color difference data. Ymin, Ydist0 to Ydist2, Cb' and Cr' are used as representative values of datasets A to D. In the present embodiments, 10 bits are allocated to Ymin, four bits are allocated to each of Ydist0 to Ydist2, two bits are allocated to the address data, and 10 bits are allocated to each of Cb' and Cr'. In the following, a detailed description is given of (4×1) compression.

First, the following matrix calculation is performed on the R data, G data and B data of each of datasets A to D to calculate the brightness data Y and the color difference data Cr and Cb:

$$\begin{bmatrix} Y_k \\ Cr_k \\ Cb_k \end{bmatrix} = \begin{bmatrix} 1 & 2 & 1 \\ 0 & -1 & 0 \\ 0 & -1 & 0 \end{bmatrix} \begin{bmatrix} R_k \\ G_k \\ B_k \end{bmatrix},$$

where $Y_k$ is the brightness data of dataset k, and $Cr_k$ and $Cb_k$ are the color difference data of dataset k. As described above, $R_k$, $G_k$ and $B_k$ are the R data, G data and B data of dataset k, respectively.

Furthermore, Ymin, Ydist0 to Ydist2, the address data, Cb' and Cr' are generated from the brightness data $Y_k$, the color difference data $Cr_k$ and $Cb_k$ of datasets A to D.

Ymin is defined as the minimum value of the brightness data $Y_A$ to $Y_D$ (minimum brightness data). Also, Ydist0 to Ydist2 are generated by performing truncating two bits of the difference between the other brightness data and the minimum brightness data Ymin. The address data are generated as data indicating which has the minimum value among the brightness data of datasets A to D. When the brightness data $Y_D$ is the smallest among the brightness data $Y_A$ to $Y_D$, Ymin and the Ydist0 to Ydist2 are calculated by the following formula:

$Y\text{min} = Y_D$, $Y\text{dist0} = (Y_A - Y\text{min}) \gg 2$, $Y\text{dist1} = (Y_B - Y\text{min}) \gg 2$, and $Y\text{dist2} = (Y_C - Y\text{min}) \gg 2$, where ">>2" is an operator indicative of a 2-bit truncation process. The fact that the brightness data $Y_D$ have the minimum value is described in the address data.

Furthermore, Cr' is generated by performing a 1-bit truncation process on the sum of the $Cr_A$ to $Cr_D$. Similarly, Cb' is generated by performing a 1-bit truncation process on the sum of $Cb_A$ to $Cb_D$. In other words, Cr' and Cb' are calculated by the following equations:

$Cr' = (Cr_A + Cr_B + Cr_C + Cr_D) \gg 1$, and $Cb' = (Cb_A + Cb_B + Cb_C + Cb_D) \gg 1$, where ">>1" is an operator indicating a 1-bit truncation process. The above-described procedure completes the generation of the (4×1) compressed data.

On the other hand, the decompression processing of the compressed image data generated by the (4×1) compression is achieved as follows: In the decompression of the (4×1) compressed data, the brightness data of each of datasets A to D are first reproduced from Ymin and Ydist0 to Ydist2. In the following, the reproduced brightness data of datasets A to D are referred to as $Y_A'$ to $Y_D'$, respectively. More specifically, the value of the minimum brightness data Ymin is used as the brightness data of the dataset which is described as having the minimum value in the address data. Furthermore, the brightness data of the other datasets are reproduced by adding values obtained by performing a 2-bit carry process on Ydist0 to Ydist2 to the minimum brightness data Ymin. When the brightness data $Y_D$ is the smallest among the brightness data $Y_A$ to $Y_D$, the brightness data $Y_A'$ to $Y_D'$ are reproduced by the following formula:

$Y_A' = Y\text{dist0} \times 4 + Y\text{min}$, $Y_B' = Y\text{dist1} \times 4 + Y\text{min}$, $Y_C' = Y\text{dist2} \times 4 + Y\text{min}$, and $Y_D' = Y\text{min}$.

Furthermore, the R data, G data and B data of datasets A to D are reproduced from the brightness data $Y_A'$ to $Y_D'$ and the color difference data Cr' and Cb' by the following matrix operation:

$$\begin{bmatrix} R_k \\ G_k \\ B_k \end{bmatrix} = \begin{bmatrix} 1 & -1 & 3 \\ 1 & -1 & -1 \\ 1 & 3 & -1 \end{bmatrix} \begin{bmatrix} Y_k' \\ Cr' \\ Cb' \end{bmatrix} \gg 2,$$

where ">>2" is an operator indicating a 2-bit truncation process. As can be understood from the above formula, the color difference data Cr' and Cb' are used in common in the reproduction of the R data, G data and B data of datasets A to D.

The above-described procedure completes the reproduction of the R data, G data and B data of datasets A to D. In other words, the decompression processing of the compressed image data generated by the (4×1) compression is achieved.

Although various embodiments of the present invention are specifically described in detail, the present invention is not limited to the above-described embodiments. The person skilled in the art would appreciate that the present invention may be implemented with various modifications. For example, although the above-described embodiments are related to the liquid crystal display device 1 including the LCD panel 2, the present invention is applicable to display devices including other display panels (for example, plasma display panels and organic EL (electroluminescence) display panels and the like).

Also, although the compression processing is performed to generate compressed image data 22 stored in the image memory 14 in the above-described embodiments, the image processing method according to the present invention is applicable to other purposes. For example, the image processing method according to the present invention may be used for transferring compressed image data to a display panel driver.

Furthermore, in one embodiment, one of the pre-process described in the first embodiment and that described in the first embodiment may be selected depending on the contents of image data to be compressed. In this case, the selected pre-process is used for the compression of the image data.

What is claimed is:

1. A display panel driver, comprising:
   a compression circuit generating compressed image data by compressing image data associated with N pixels, N being an natural number equal to or more than three and the image data indicating a grayscale level of each subpixel of each of the N pixels;
   an image memory storing said compressed image data;
   a decompression circuit generating decompressed image data by decompressing said compressed image data read from said image memory; and
   a drive circuit driving a display panel in response to said decompressed image data,
   wherein said compression circuit includes:
   a representative-values calculation circuit configured to generate M datasets each including a plurality of representative values by performing a pre-process on said image data associated with said N pixels, M being a natural number more than one and less than N, wherein performing said pre-process on said image data comprises determining maximum values, minimum values, center values, and variation values of said image data associated with said N pixels; and
   an all-combinations comparing compression circuit configured to calculate correlations between two datasets selected from said M datasets for all possible combinations of the two datasets, to select a compression process from a plurality of compression processes in response to the calculated correlations, and to generate said compressed imaged data by compressing said M datasets by using said selected compression process, wherein said selected datasets are selected based on said maximum values, said minimum values, said center values and said variation values.

2. The display panel driver, according to claim 1, wherein, in said pre-process, said representative-values calculation circuit performs grouping of said N pixels into M groups which are associated with said M datasets, respectively, and calculates the representative values included in each of said M datasets, based on image data of pixels belonging to associated one of said M groups.

3. The display panel driver, according to claim 2, wherein each of said N pixels includes a subpixel associated with a first color, a subpixel associated with a second color and a subpixel associated with a third color, wherein determining said maximum and minimum values comprises determining maximum and minimum values of greyscale levels of the subpixels of the first color, the subpixels of the second color, and a subpixels of the third color, and determining said variation values comprises determining a variation value of the greyscale levels of the subpixels of the first color, the subpixels of the second color, and a subpixels of the third color, and
wherein the grouping of said N pixels into said M groups is achieved by initially grouping said N pixels into a single group and repeatedly performing a procedure which involves: selecting a group and color for which a difference between said maximum and said minimum values of grayscale levels of subpixels is largest from one or more groups of current interest, and grouping pixels belonging to the selected group into two groups by comparing said grayscale levels of subpixels associated with said selected color to a center value of said grayscale levels of said subpixels associated with said selected color.

4. The display panel driver, according to claim 3, wherein said representative-values calculation circuit is further configured to: for each of said two groups, calculate maximum and minimum values, a center value, and variation value of said subpixels of said pixels, and select one of said two groups based on at least one of said maximum and minimum values, said center value, and said variation value of said subpixels of said pixels of the two groups.

5. The display panel driver according to claim 1, wherein said M datasets includes four datasets,
wherein said plurality of compression processes include:
a first compression process which involves calculating a first representative value associated with said four datasets and incorporating said first representative value into said compressed image data;
a second compression process which involves calculating a second representative value associated with two of said four datasets, calculating a third representative value associated with the other two of said four datasets and incorporating said second and third representative values into said compressed image data;
a third compression process which involves calculating a fourth representative value associated with two datasets of said four datasets, generating first bit-reduced data by performing a bit-reducing process on each of the other two datasets independently, and incorporating said fourth representative value and said first bit-reduced data into said compressed image data; and
a fourth compression process which involves generating second bit-independently, and incorporating said second bit-reduced data into said compressed image data.

6. The display panel driver, according to claim 1, wherein said N pixels include eight pixels,
wherein said M datasets include four datasets each including three representative values, and
wherein, in said pre-process, said representative-values calculation circuit generates Y data, Cr data and Cb data for each of said eight pixels by performing a YCrCb transform on image data of said eight pixels, calculates eight first representative values from data selected from the Y data, Cr data and Cb data of said eight pixels, determining said maximum and minimum values comprises determining maximum and minimum values of said Cr data and said Cb data, said selected data having a largest difference between said maximum and minimum values of said Cr data and said Cb data, and calculates four second representative values from the remaining two of the Y data, Cr data and Cb data of said eight pixels, each of said four datasets including two of said eight first representative values and one of said four second representative values.

7. The display panel driver according to claim 6, wherein said plurality of compression processes include:
a first compression process which involves calculating a first representative value associated with said four datasets and incorporating said first representative value into said compressed image data;
a second compression process which involves calculating a second representative value associated with two of said four datasets, calculating a third representative value associated with the other two of said four datasets and incorporating said second and third representative values into said compressed image data;
a third compression process which involves calculating a fourth representative value associated with two datasets of said four datasets, generating a first bit-reduced data by performing a bit-reducing process on each of the other two datasets independently, and incorporating said fourth representative value and said first bit-reduced data into said compressed image data; and
a fourth compression process which involves generating second bit-reduced data by performing a bit-reducing process on each of said four datasets, independently, and incorporating said second bit-reduced data into said compressed image data.

8. The display panel driver, according to claim 1,
wherein said N pixels include at least eight pixels,
wherein said M datasets includes at least four datasets each including at least three representative values, and
wherein, in said pre-process, said representative-values calculation circuit generates Y data, Cr data and Cb data for each of the at least eight pixels by performing a YCrCb transform on image data of the at least eight pixels, calculates at least eight first representative values from data selected from the Y data, Cr data and Cb data of the at least eight pixels,
wherein determining said maximum and minimum values comprises determining maximum and minimum values of said Cr data and said Cb data, said selected data having a largest difference between said maximum and minimum values of said Cr data and said Cb data.

9. The display panel driver, according to claim 8, wherein, in said pre-process, said representative-values calculation circuit calculates four second representative values from the remaining two of the Y data, Cr data and Cb data of the at least eight pixels, each of the at least four datasets including two of said eight first representative values and one of said four second representative values.

10. A display device, comprising:
a display panel; and
a display panel driver driving said display panel, wherein said display panel driver includes:
   a compression circuit generating compressed image data by compressing image data associated with N pixels, N being an natural number equal to or more than three and the image data indicating a grayscale level of each subpixel of each of the N pixels;
   an image memory storing said compressed image data;
   a decompression circuit generating decompressed image data by decompressing said compressed image data read from said image memory; and
   a drive circuit driving a display panel in response to said decompressed image data,
wherein said compression circuit includes:
   a representative-values calculation circuit configured to generate M datasets each including a plurality of representative values by performing a pre-process on said image data associated with said N pixels, M being a natural number more than one and less than N, wherein performing said pre-process on said image data comprises determining maximum values, minimum values, center values, and variation values of said image data associated with said N pixels; and
   an all-combinations comparing compression circuit configured to calculate correlations between two datasets selected from said M datasets for all possible combinations of the two datasets, to select a compression process from a plurality of compression processes in response to the calculated correlations, and to generate said compressed imaged data by compressing said M datasets by using said selected compression process, wherein said selected datasets are selected based on said maximum values, said minimum values, said center values and said variation values.

11. The display device, according to claim 10, wherein, in said pre-process, said representative-values calculation circuit performs grouping of said N pixels into M groups which are associated with said M datasets, respectively, and calculates the representative values included in each of said M datasets, based on image data of pixels belonging to associated one of said M groups.

12. The display device, according to claim 11, wherein each of said N pixels includes a subpixel associated with a first color, a subpixel associated with a second color and a subpixel associated with a third color,
wherein the grouping of said N pixels into said M groups is achieved by initially grouping said N pixels into a single group and repeatedly performing a procedure which involves: selecting a group and color for which a difference between maximum and minimum values of grayscale levels of subpixels is largest from one or more groups of current interest, and grouping pixels belonging to the selected group into two groups by comparing said grayscale levels of subpixels associated with the selected color to a center value of said grayscale levels of said subpixels associated with said selected color, and wherein said maximum and minimum values of said grayscale levels of said subpixels and said center value are determined by performing said pre-process.

13. The display device according to claim 10, wherein said N pixels include eight pixels,
wherein said M datasets include four datasets each including three representative values, and
wherein, in said pre-process, said representative-values calculation circuit generates Y data, Cr data and Cb data for each of said eight pixels by performing a YCrCb transform on image data of said eight pixels, calculates eight first representative values from data selected from the Y data, Cr data and Cb data of said eight pixels, determining said maximum and minimum values comprises determining maximum and minimum values of said Cr data and said Cb data, said selected data having a largest difference between said maximum and minimum values of said Cr data and said Cb data, and calculates four second representative values from the remaining two of the Y data, Cr data and Cb data of said eight pixels, each of said four datasets including two of said eight first representative values and one of said four second representative values.

14. An image processing circuit, comprising:
a representative-values calculation circuit configured to generate M datasets each including a plurality of representative values by performing a pre-process on image data associated with N pixels, M being a natural number more than one and less than N and the image data indicating a grayscale level of each subpixel of each of the N pixels, wherein performing said pre-process on said image data comprises determining maximum values, minimum values, center values, and variation values of said image data associated with said N pixels; and
an all-combinations comparing compression circuit configured to calculate correlations between two datasets selected from said M datasets for all possible combinations of the two datasets, to select a compression process from a plurality of compression processes in response to the calculated correlations, and to generate compressed imaged data by compressing said M datasets by using said selected compression process, wherein said selected datasets are selected based on said maximum values, said minimum values, said center values and said variation values.

15. The image processing circuit according to claim 14, wherein, in said pre-process, said representative-values calculation circuit performs grouping of said N pixels into M groups which are associated with said M datasets, respectively, and calculates the representative values included in each of said M datasets, based on image data of pixels belonging to associated one of said M groups.

16. The image processing circuit according to claim 15, wherein each of said N pixels includes a subpixel associated with a first color, a subpixel associated with a second color and a subpixel associated with a third color,
wherein determining said maximum and minimum values comprises determining maximum and minimum values of greyscale levels of the subpixels of the first color, the subpixels of the second color, and a subpixels of the third color, and determining said variation values comprises determining a variation value of the greyscale levels of the subpixels of the first color, the subpixels of the second color, and a subpixels of the third color, and wherein the grouping of said N pixels into said M groups is achieved by initially grouping said N pixels into a single group and repeatedly performing a procedure which involves: selecting a group and color for which a difference between said maximum and said minimum values of grayscale levels of subpixels is largest from one or more groups of current interest, and grouping pixels belonging to the selected group into two groups by comparing said grayscale levels of subpixels associated with said selected color to a center value of said grayscale levels of said subpixels associated with said selected color.

17. The image processing circuit according to claim 14, wherein said N pixels include eight pixels, wherein said M datasets include four datasets each including three representative values, and wherein, in said pre-process, said representative-values calculation circuit generates Y data, Cr data and Cb data for each of said eight pixels by performing a YCrCb transform on image data of said eight pixels, calculates eight first representative values from data selected from the Y data, Cr data and Cb data of said eight pixels, determining said maximum and minimum values comprises determining maximum and minimum values of said Cr data and said Cb data, said selected data having a largest difference between said maximum and minimum values of said Cr data and said Cb data, and calculates four second representative values from the remaining two of the Y data, Cr data and Cb data of said eight pixels, each of said four datasets including two of said eight first representative values and one of said four second representative values.

18. An image processing method, comprising:

generating M datasets each including a plurality of representative values by performing a pre-process on image data associated with N pixels, M being a natural number more than one and less than N and the image data indicating a grayscale level of each subpixel of each of the N pixels, wherein performing said pre-process on said image data comprises determining maximum values, minimum values, center values, and variation values of said image data associated with said N pixels;

calculating correlations between two datasets selected from said M datasets for all possible combinations of the two datasets, wherein said selected datasets are selected based on said maximum values, said minimum values, said center values and said variation values;

selecting a compression process from a plurality of compression processes in response to the calculated correlations; and generating compressed imaged data by compressing said M datasets by using said selected compression process.

19. The image processing method according to claim 18, wherein, in said pre-process, grouping of said N pixels into M groups which are associated with said M datasets, respectively, and calculates the representative values included in each of said M datasets, based on image data of pixels belonging to associated one of said M groups.

20. The image processing method according to claim 19, wherein the grouping of said N pixels into said M groups is achieved by initially grouping said N pixels into a single group and repeatedly performing a procedure which involves: selecting a group and color for which a difference between maximum and minimum values of grayscale levels of subpixels is largest from one or more groups of current interest, and grouping pixels belonging to the selected group into two groups by comparing grayscale levels of subpixels associated with a selected color to a center value of said grayscale levels of said subpixels associated with said selected color, and wherein said maximum and minimum values of said grayscale levels of said subpixels and said center value are determined by performing said pre-process.

* * * * *

UNITED STATES PATENT AND TRADEMARK OFFICE
CERTIFICATE OF CORRECTION

PATENT NO. : 10,089,953 B2
APPLICATION NO. : 14/063968
DATED : October 2, 2018
INVENTOR(S) : Hirobumi Furihata et al.

Page 1 of 1

It is certified that error appears in the above-identified patent and that said Letters Patent is hereby corrected as shown below:

In the Specification

Column 37, Line 35, delete "$|B_C–R_D|$" and insert -- $|R_C–R_D|$ --, therefor.

Signed and Sealed this
Twenty-first Day of April, 2020

Andrei Iancu
*Director of the United States Patent and Trademark Office*